COLOR-TELEVISION SYSTEM

Original Filed Dec. 18, 1951 4 Sheets-Sheet 1

INVENTOR.
DONALD RICHMAN
BY Laurence B. Dodds
ATTORNEY

COLOR-TELEVISION SYSTEM

Original Filed Dec. 18, 1951

INVENTOR.
DONALD RICHMAN

BY Laurence B. Dodds

ATTORNEY

COLOR-TELEVISION SYSTEM

INVENTOR.
DONALD RICHMAN

BY Laurence B. Dodds
ATTORNEY

COLOR-TELEVISION SYSTEM

Original Filed Dec. 18, 1951 4 Sheets-Sheet 4

INVENTOR.
DONALD RICHMAN

BY Lawrence B. Dodds

ATTORNEY

United States Patent Office 2,773,930

Patented Dec. 11, 1956

2,773,930

COLOR-TELEVISION SYSTEM

Donald Richman, Fresh Meadows, N. Y., assignor to Hazeltine Research, Inc., Chicago, Ill., a corporation of Illinois Continuation of application Serial No. 262,308, December 18, 1951. This application May 3, 1954, Serial No. 426,968

27 Claims. (Cl. 178—5.4)

*General*

The present invention relates in general to color-television systems, especially to such systems compatible with monochrome systems embodying the current standards in the United States and, in particular, to new and improved signal-translating apparatus for use in color-television receivers of such systems. More specifically, the invention relates to such apparatus which has the characteristic of reducing the annoyance to the viewer of a reproduced image, of random brightness noise fluctuations developed therein and caused by the presence of undesired color signals. The present invention is related to that described in the copending application of Bernard D. Loughlin, Serial No. 159,212, filed on May 1, 1950, and entitled "Color-Television System" and is a continuation of application Serial No. 262,308, filed December 18, 1951, and entitled "Color-Television System," which is now abandoned.

In one form of compatible television system, more fully described in the RCA Review for December 1949, volume X, pages 504–524, signals representative of the primary colors of the image being televised are sampled at the transmitter by a device having symmetrical electrical characteristics with respect to these color signals, thereby utilizing approximately the same amount of signal energy for green, red and blue color signals of similar color intensities. The sampling process develops a composite color signal having a color subcarrier wave signal of a frequency of approximately 3.6 megacycles which has amplitude and phase characteristics related to three different color-signal characteristics, being modulated in succession at 120° intervals by the low-frequency components of those color signals. In addition, a monochrome or brightness component is developed from the primary color signals which is composed of equal energy values of green, red and blue and conventionally has a band width of 0–4 megacycles. The combination of this monochrome component and composite color-signal component produces a composite video-frequency signal having a band width of 0–4 megacycles, which modulates a wave signal and is transmitted.

The modulated wave signal is intercepted by a receiver and a synchronous detector, similar to the sampler described above, is utilized at the receiver selectively to detect the low-frequency components of the color signals from the composite video-frequency signal at 120° intervals of a cycle of the color subcarrier wave signal. These derived color-signal components are then combined with the high-frequency components of the received monochrome signal effectively to provide three color signals each having a band width of 0–4 megacycles for application to the control circuit of the image-reproducing device.

In such a symmetrical sampling system, the derived color signals are developed from a composite color signal which simultaneously occupies the same frequency band in the system as the high-frequency monochrome components. Due to many reasons including extraneous noise developed in the band through which the color signals are translated and due to cross talk between the high-frequency monochrome components and the composite color signal, the derived color signals may include undesired noise-signal components which tend to cause spurious color signals to appear in the reproduced image. For example, high-frequency random-noise signal components having frequencies above 2 megacycles but below the upper frequency limit of the video-frequency signal band, when heterodyned with the 3.6 megacycle subcarrier wave produce low-frequency noise components in the 0–2 megacycle band occupied by the color-signal components. These heterodyned noise-signal components are in addition to the usual random low-frequency noise-signal components present in a monochrome type of television signal. Since similar noise-signal components occur in each of the color-signal channels but at 120° phase relationships with respect to each other, if each of the primary color images reproduced from the signals in each of these color-signal channels had an equal effect on the human eye, the noise signals present would effectively cancel one another in each complete cycle of the subcarrier wave signal. Thus the noise-signal components present at 0°, 120° and 240° would be added vectorially and produce a net noise result of zero. However, it is well recognized that the sensitivity of the human eye to various colors having the same intensity is not identical. This may be determined in a very simple manner by adjusting the gains in each of the channels individually related to the three color primaries in the reproducing device until the primary colors are such as to combine optically to produce the sensation of white in the human eye. The brightness for white may be designated as unity and, if the brightness contributed by each of the primary colors is measured, it will be found that green contributes the most, red about half as much as green, and blue the least brightness sensation in the human eye. The fractional part of unity contributed by each of the colors is the relative luminosity of the color. The brightness sensations produced by the primary colors on the human eye may be called the visual brightness effects of these colors. Because of this difference in the visual brightness effects of the different primary colors, those added noise signals having similar electrical energies and which cause the development of spurious colors do not produce similar visual brightness effects and, therefore, do not cancel optically as otherwise might be expected.

Though the previous paragraph described the effect of high-frequency random-noise signal components in a system including a sampling device operating at a sampling frequency, it should be understood that the added noise-signal components thus produced may have counterparts in added components of signals other than random noise, such added components being produced in a manner similar to the production of the added noise-signal components just described. Thus interference signals having a substantially constant frequency may occur at the upper end of the 4 megacycle pass band of the system in such a manner that they would not normally be objectionable, since the eye is only slightly sensitive to noise effects causing high-frequency variations in the visual brightness of the image but is much more sensitive to noise causing low-frequency brightness effects. Thus if the high-frequency interfering signals, by being heterodyned with the sampling frequency, become low-frequency interference signals, there result bothersome brightness variations. Similarly, high-frequency components of the monochrome signal may heterodyne with the sampling frequency to produce objectionable added low-frequency components in the reproduced image. Therefore, it is to be understood that where the term "added noise-signal components" is used hereinafter the expression is intended to include all added low-frequency interference of the type just considered and of similar types.

It would be desirable to be able effectively to eliminate the visual brightness fluctuations in the reproduced image caused by the added low-frequency noise-signal components separately affecting the different color signals. Since it is well known that noise which produces visual brightness fluctuations of a low-frequency type is much more annoying to the observer than noise which produces color fluctuations without resultant brightness fluctuations, the bothersome effect of such visual brightness fluctuations may be eliminated effectively by converting the noise-brightness fluctuations to noise-color fluctuations to which the eye is relatively insensitive. The copending application Serial No. 159,212, previously mentioned, is directed to a system utilizing such a method for diminishing these effects. The present invention is related to the one just mentioned, being directed to another type of system for overcoming the disadvantages just described.

It is an object of the present invention, therefore, to provide a new and improved color-television system which avoids the aforementioned limitations of the symmetrically detected color system described.

It is another object of the present invention to provide a new and improved color-television system of the type described having greatly increased compatibility for color and monochrome image reproduction.

It is still another object of the invention to provide a new and improved signal-translating apparatus in a color-television receiver of a system of the type described in which the amount of visual brightness noise present in a reproduced image is substantially no greater than that present in a similar type of monochrome-television system.

It is a further object of the invention to provide a new and improved signal-translating apparatus in a color-television receiver of a system of the type described in which at least some of the visual brightnes noise produced locally within the color-television receiver is effectively canceled in the reproduced image.

It is a still further object of the invention to provide a new and improved signal-translating apparatus in a color-television receiver in which a monochrome-signal component of a television signal substantially determines the visual brightness of a reproduced image and the color-signal components determine substantially only the color characteristics thereof, while any visual brightness effects produced thereby are substantially canceled.

In accordance with the present invention, there is provided a signal-translating apparatus for a color-television receiver which utilizes a color image-reproducing device for reproducing an image from a predetermined group of primary colors. This apparatus includes a circuit for supplying a composite television signal representative of a color image and including a first portion having a band width of greater than 0–2 megacycles representative of the visual brightness thereof and a second portion having a subcarrier wave signal having a specific band width and modulated by at least a signal representative of the chromaticity of the image, the chromaticity signal undesirably tending to affect the luminance in an image reproduced by the device. The apparatus also includes a signal-deriving means coupled to the supply circuit and including a network for translating said modulated subcarrier wave signal for deriving from a specific phase thereof a control signal representative of the undesired luminance effects of the chromaticity signal and includes a signal-combining device coupled to the supply circuit and the deriving means and responsive jointly to at least the first portion and the control signal to develop a resultant signal which is representative of at least the visual brightness of the image and which includes a component inversely related to the undesired luminance effects. Finally, the apparatus includes means for utilizing the resultant signal and the subcarrier wave signal in the image-reproducing device to reproduce the image, whereby the first portion is effective primarily to determine the visual brightness of the image and the second portion is effective primarily to determine the chromaticity of the image with any brightness changes due to the undesired luminance effects being effectively eliminated.

In accordance with another embodiment of the present invention, a color-television system comprises a transmitter which includes means for developing at least a first signal primarily representative of the visual brightness of an image and substantially independent of its chromaticity. The transmitter also includes means for developing a subcarrier wave signal modulated by at least a signal which is primarily representative of the chromaticity of said image said modulated subcarrier wave signal including a component representative of the relative luminosity of elemental areas of the image, means for combining the developed signals to form a composite signal, and means for transmitting the composite signal. The system also comprises a receiver for the transmitted signals including a signal-translating system for translating a first portion of the composite signal representative of the first signal and for translating a second portion representative of the modulated subcarrier wave signal, the second portion tending to include undesired components affecting the visual brightness in a reproduction of the image. The receiver also includes signal-deriving means coupled to the signal-translating system for deriving from the second portion a control signal which is related to the component representative of the relative luminosity and which includes a component representative of the luminance effects developed by the undesired components. The receiver also includes a signal-combining device coupled to the signal-translating system and the signal-deriving means for combining at least the first portion and the control signal to develop a resultant signal which is representative of at least the brightness of the image and which includes components inversely related to the luminance effects developed by the undesired components, and means for utilizing the resultant signal and the subcarrier wave signal to reproduce the image, whereby the resultant signal determines the brightness of the reproduction of the image and simultaneously substantially reduces any brightness changes which the second portion tends to produce therein.

In accordance with a particular feature of the invention, there is provided in a color-television receiver apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image. The apparatus comprises a signal-translating system responsive to the composite signal for translating at least the first portion and for translating a modulated signal which is representative of the modulated subcarrier wave signal and which includes undesired components tending to affect the visual brightness of the image. The apparatus includes a signal-deriving means coupled to the system for deriving from the translated modulated signal a control signal which is related to the component representative of the relative luminosity and which includes a component representative of the relative luminosity effects developed by the undesired components. The apparatus also includes a signal-combining device coupled to the system and to the signal-deriving means for combining at least the first portion and the control signal to develop a resultant signal which is representative of at least the brightness of the image and which includes components inversely related to the luminosity effects of said undesired components, and means for utilizing the resultant signal and the subcarrier wave signal to reproduce the image, whereby the resultant signal is representative of the brightness of the image with any brightness changes due to the undesired components being effectively eliminated.

In accordance with another feature of the invention, there is provided a color-television transmitter comprising means for developing a plurality of color signals collectively representative of the brightness and chromaticity of an image and a first signal-translating channel coupled to the developing means and including a plurality of amplifier circuits for developing a first signal primarily representative of the visual brightness of an image and substantially independent of its chromaticity. The transmitter also comprises a second signal-translating channel coupled to the developing means and including a modulator arrangement for developing a subcarrier wave signal and for modulating the subcarrier wave signal with the color signals to develop a second signal primarily representative of the chromaticity of the image and which includes a component representative of the relative luminosity of elemental areas of the image. In addition, the transmitter comprises a third signal-translating channel coupled to the developing means and including a signal-combining circuit for combining the color signals to develop a third signal representative of the brightness of the image and a modulator circuit for combining at least portions of the first, second and third signals to develop a fourth signal representative of the chromaticity of the image modulated by a signal representative of the relative luminosity of elemental areas of the image. The transmitter also comprises means for combining at least two of the first, second, third and fourth signals to form a composite signal.

The term "monochrome signal" as used herein refers to that portion of the composite video-frequency signal that would reproduce an image in a standard monochrome receiver and, therefore, is the signal representative solely of the brightness of the image. Thus the monochrome signal can be considered substantially to be the average of the composite video signal over a complete sampling cycle; in other words, to be the composite video-frequency signal with any subcarrier signals and their modulation components removed, the latter components having been inserted to translate the color characteristics of an image. The monochrome signal may be a signal including equal amounts of all color signals or may be a signal comprised of different amounts of the primary color signals.

The term "color signal" as used herein refers to a signal whose instantaneous value is proportional to the intensity of a primary color of an elemental area of an image being scanned at the transmitter. Portions of the frequency band of this signal are designated as "color-signal components."

The term "composite color-signal component" as used herein refers to that signal formed by the modulation of a generated color wave signal or subcarrier wave signal by selected frequency components of the color signal or, in other words, by color-signal components. The composite color-signal component is a component of the composite video-frequency signal and has amplitude and phase characteristics related to the color characteristics of the image being televised, specifically, the amplitude thereof being related to the saturation of the color and the phase thereof being related to the hue of the color.

The term "composite video-frequency component" as used herein refers to a signal resulting from the combination of the monochrome signal and the composite color-signal component.

The term "brightness" as used herein broadly refers to the brightness effects of a monochrome image or object, the degree of lightness or darkness of the image or object, and specifically relates to the optical sensation produced by a signal composed of signals representative of the primary colors combined in any proportions other than proportions related to the relative luminosities of the colors.

The term "visual brightness" as used herein refers to the optical sensation produced by a signal which is composed of amounts of the signals representative of the primary colors proportioned in relation to the relative luminosities of the colors.

For a better understanding of the present invention, together with other and further objects thereof, reference is had to the following description taken in connection with the accompanying drawings, and its scope will be pointed out in the appended claims.

Referring to the drawings.

Figure 2A:
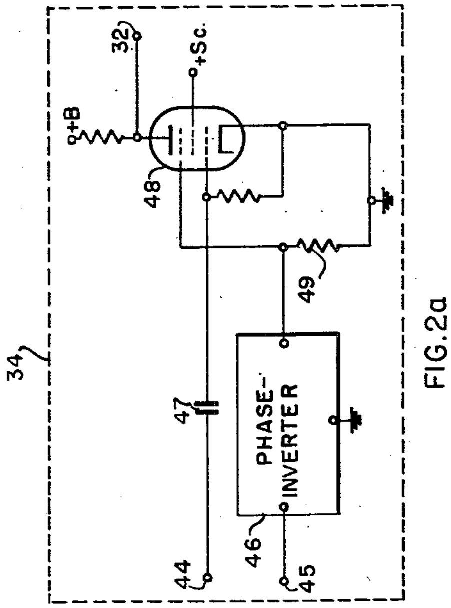
Fig. 2 is a schematic diagram of a color-television receiver embodying the present invention.
Figure 3:
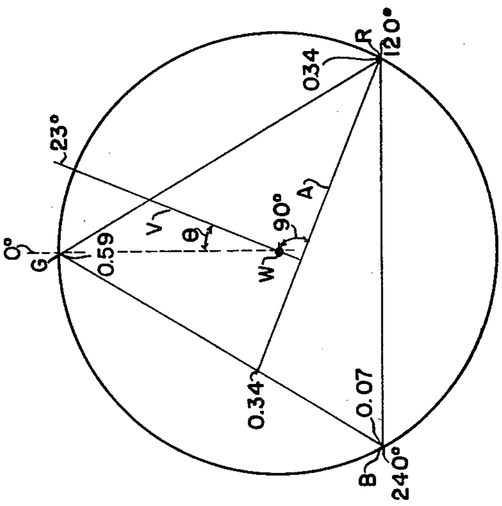
Figure 2:
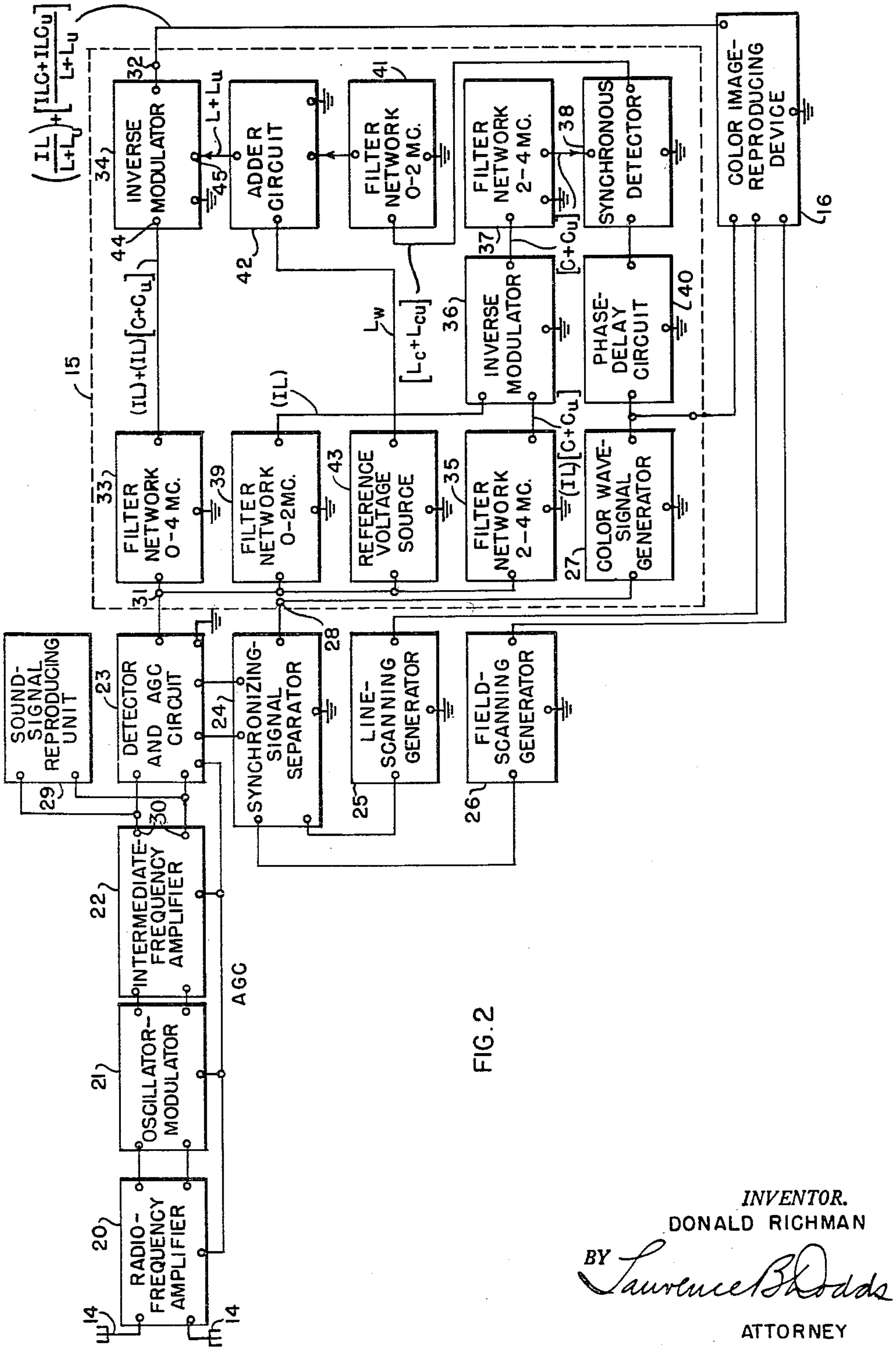
Figure 4:
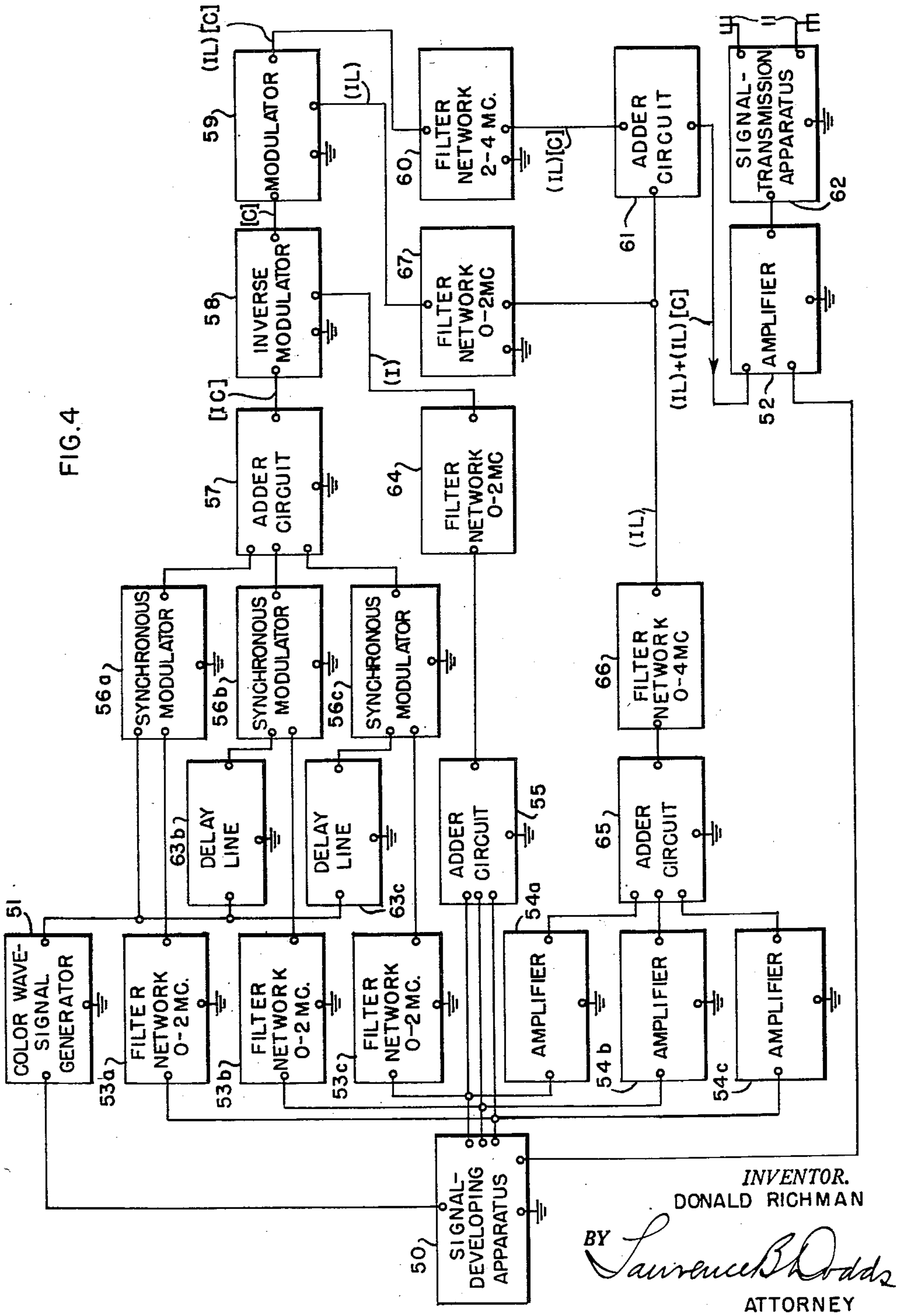
Figure 5:
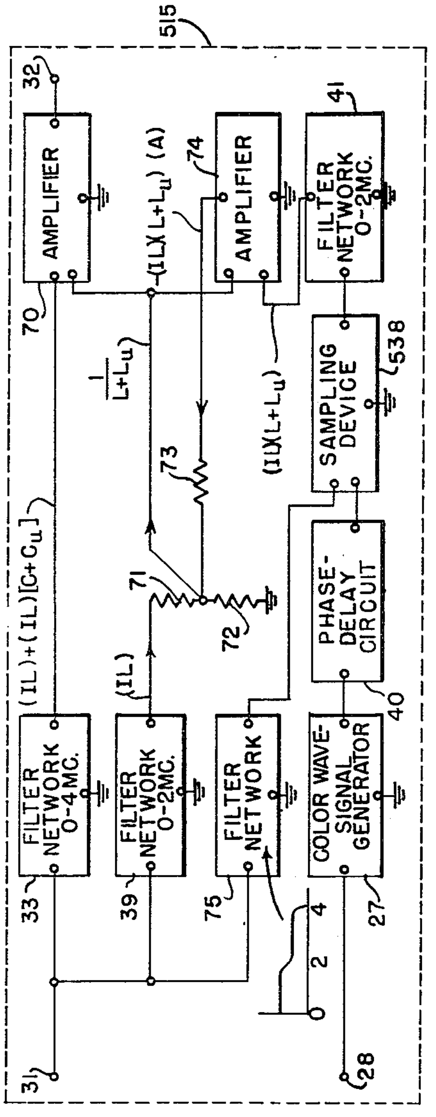
Figure 6:
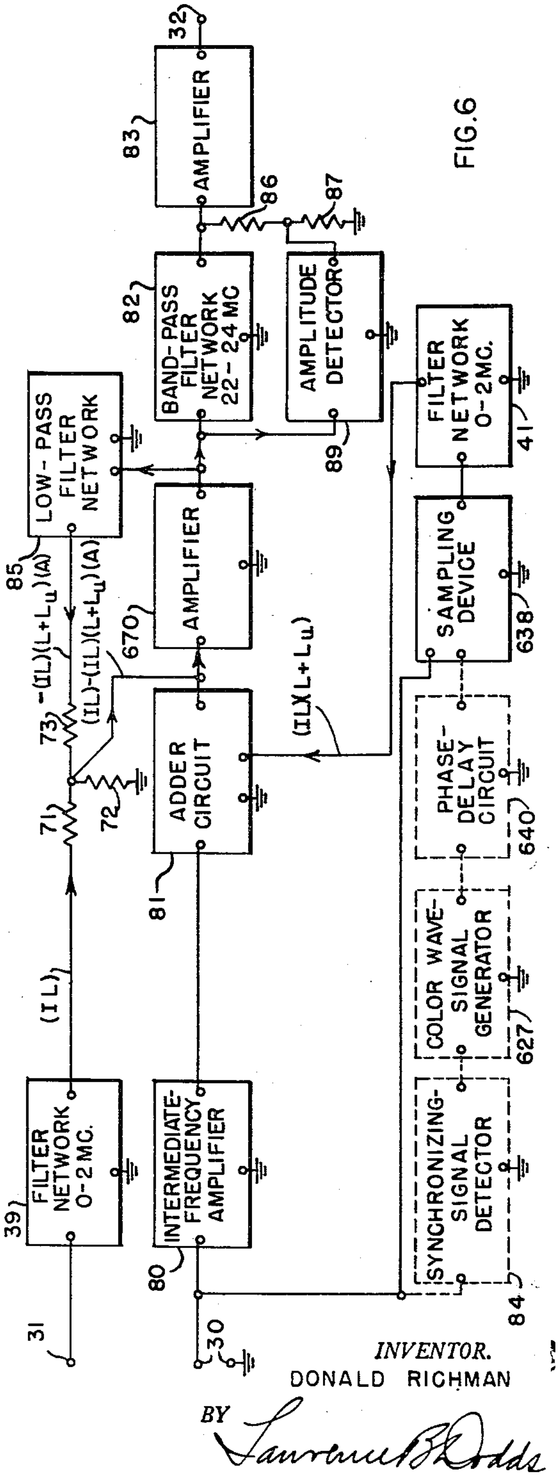

Fig. 2*a* is a circuit diagram of a unit in the receiver of Fig. 2;

Fig. 3 is an explanatory diagram utilized in explaining the operation of the receiver of Fig. 2;

Fig. 4 is a schematic diagram of a color-television transmitter embodying the present invention and Figs. 5 and 6 are schematic diagrams of modifications of the receiver of Fig. 2.

Figure 1:
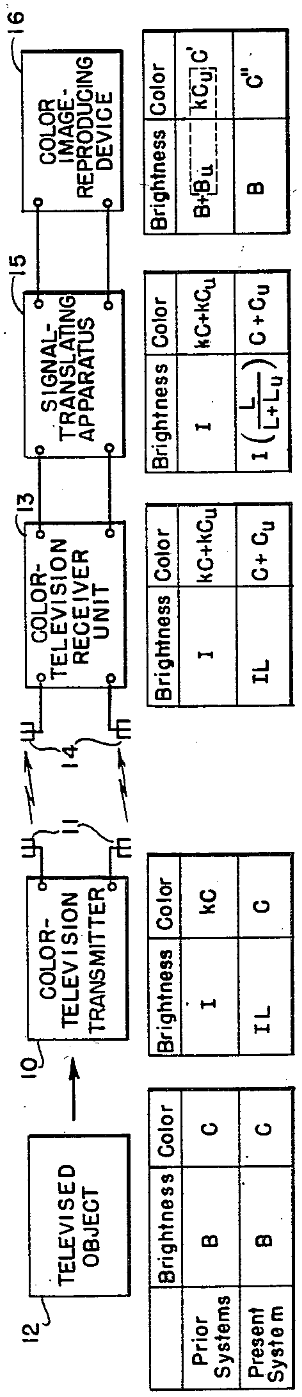
Fig. 1 is a generalized schematic diagram of a color-television system and an associated chart including information relative to the signals translated through the system and which is utilized in explaining the present invention.

*General description and explanation of operation of the color-television system of Fig. 1*

In describing the invention, a general description and explanation of the system as a whole including a brief consideration of the problems solved by the invention and the manner of their solution will first be presented. Referring now to Fig. 1, a color-television transmitter 10 having an antenna system 11, 11 and which may be of a type similar to that previously described with reference to the December 1949, issue of the RCA Review is arranged to televise a colored object 12. In general, the radiated signal comprises a radio-frequency signal modulated by a composite video-frequency signal having a band width of approximately 0–4 megacycles and including approximately a 0–4 megacycle monochrome signal and a 3.6 megacycle color wave signal modulated at three different phase points by color-signal components representative of the green, red and blue color characteristics of the image. The radiated signal is intercepted by the color-television receiver unit 13 by means of antenna circuit 14, 14 thereof. The unit 13 may be of any conventional type suitable for intercepting a television signal and may include the radio-frequency, oscillator-modulator, intermediate-frequency and second detector stages of a conventional television recever. The composite video-frequency signal of the receiver signal is applied to a signal-translating apparatus 15 wherein the monochrome signal and the color-signal components are derived and applied to a color image-reproducing device 16. The device 16 may be of any conventional type suitable for reproducing color-television images while the apparatus 15 may, in prior systems, be the color-signal detection portion of the receiver such as is described in the RCA Review article previously referred to or, in the present system, be in accordance with the teachings of the invention as described more fully hereinafter. It is also possible that the ultimate derivation of the brightness and color-signal components may occur in a portion of the device 16.

Considering now in more detail the operation of the system of Fig. 1 and referring particularly to the information in the associated charts, the televised object 12 may be considered to have a visual brightness B and color C as viewed by the human eye. Initially, the operation of prior systems in televising and reproducing an image of such an object will be considered by referring only to the information in the upper portion of each of the charts. Thus, in prior systems, considering the characteristics of a single picture element or elemental area as the electron beam impinges upon that area, the transmitter 10 analyzes the color C of the area in terms of the relative amounts of the three primary colors green, red and blue therein. This analysis develops color signals individually representative of the primary colors. At the transmitter, the color signals are combined into a composite signal $kC$ and equal fractional amounts of the color signals are also combined additively to develop a brightness signal I. The components of the signal I are not combined in amounts proportionate to their relative luminosity. The signals I and $kC$ are translated through a common pass band in the system in such a manner that the frequencies of the signals relating to color and brightness information at least partially overlap. Thus, because of the channel characteristics, noise, cross talk and other reasons previously considered, the signals designated I and $kC$ take the form in the receiver of the signals designated I and $kC+kC_u$, wherein the signal $kC_u$ represents undesired color signals. The brightness signal I and each of the color signals related to the primary colors green, red and blue are derived in the unit 15 and applied to the image-reproducing device 16 to reproduce the color and brightness of the televised elemental area.

In the device 16, due to the relative luminosities of the different colors, as previously described, the color fluctuations caused by the undesired color signal $kC_u$ cause undesired brightness fluctuations, designated as $B_u$, to appear in the reproduced elemental area as viewed by the eye. This conversion of undesired color effects $kC_u$ to undesired brightness effects $B_u$ occurs because, as the undesired color signals vary in color, the eye sees these different colors at different brightness levels. As a result, a color C′ is reproduced which does not faithfully represent the color C of the televised object but which is acceptable to the eye. In addition, the visual brightness of the image is no longer B but becomes $B+B_u$, where $B_u$ represents the undesired brightness effects resulting from the presence of the undesired color signal $kC_u$. The visual brightness effect $B+B_u$ can be represented in terms of electrical signals as $$I\left(\frac{L}{L+L_u}\right)$$

where I represents a brightness signal as previously discussed, L is representative of the relative luminosity of the elemental area of the image being televised and $L_u$ represents the luminosity effect developed by the undesired color signal $kC_u$. The present invention is directed to the elimination of the factor $B_u$ in each elemental area of the reproduced image.

Considering now the present system and referring to the information in the lower portions of the charts, at the transmitter the visual brightness B of the elemental area of the televised object is converted to a signal IL which is proportioned in terms of the luminosity of the image and, therefore, may be described as a visual brightness signal. The visual brightness signal is one related to the relative sensitivity of the eye to the green, red and blue color phosphors in the image-reproducing device. As in prior systems, the undesired color signal $C_u$ is, at least in part, developed in the receiver 13 as a result of the simultaneous transmission of the color and visual brightness signals through a common pass band in a frequency overlapping manner. To offset the brightness effects $B_u$ due to the undesired color signal $C_u$, there is developed in the apparatus 15 a control signal related to the luminosity of the televised elemental area and represented by the term $L+L_u$ where, as previously described, the term L represents the relative luminosity of the elemental area of the image and the term $L_u$ represents the luminosity effects in such area developed by the undesired color signal $C_u$. In the apparatus 15, the visual brightness signal IL is divided by the control signal $L+L_u$ and, as a result, there is developed in that portion of the apparatus 15 directed to translating the signals representative of the brightness of the image a signal related to $L_u$ which has brightness fluctuations inverse to those developed by the color signal $C_u$, as previously described. Consequently, the eye sees in the device 16 for each elemental area a visual brightness B and a color C″. The undesired brightness fluctuations $B_u$ caused by the undesired color signal $C_u$ are eliminated by the correction signal $L_u$. While the color signal C″ may not be an ideally faithful reproduction of the color of the image, the quality thereof as viewed by the eye appears to be adequate and is much improved over the color of images reproduced in prior systems.

Thus, it is seen that the essential feature of the invention as embodied in a transmitter is the proportioning of the signal representative of the visual brightness B in terms of the relative luminosities of the color signals utilized to develop that signal. Such a signal is a visual brightness signal and the invention teaches that at the receiver a signal representative of relative luminosity of each elemental area is derived and combined with the relative luminosity signal utilized at the transmitter, to effect a brightness result in the brightness channel of the receiver inverse to that which the undesired color signal would otherwise develop in each elemental area of the reproduced image.

It should be understood that the undesired color signal causing the undesired brightness fluctuations may include information desirable for purposes other than brightness, for example, may include acceptable color information which in a predetermined type of color image-reproducing device may, in addition to providing color, tend to disturb the luminance in a color image reproduced by such device. Additionally, the term "luminosity" or "relative luminosity," though employed herein as defining a certain type of electrical signal having known characteristics when employed in a predetermined reproducing device, accurately only defines the light effect of such signal in such device. That is, a signal as such is not a "luminance" signal but may be so classified when the light effect of such signal is considered with respect to a predetermined reproducing device. This light effect may vary when the signal is applied to different types of such devices and different luminance corrections may be required for such variations.

*General description of receiver of Fig. 2*

Referring now to the receiver of Fig. 2, there is represented a color-television receiver which includes a radio-frequency amplifier 20 of any desired number of stages having its input circuit connected to the antenna system 14, 14. Coupled in cascade to the output circuit of the amplifier 20, in the order named, are an oscillator-modulator 21, an intermediate-frequency amplifier 22 of one or more stages having output terminals 30, 30, a detector and automatic-gain-control (AGC) circuit 23, a signal-translating apparatus 15 to be described more fully hereinafter, and a color image-reproducing device 16. The color image-reproducing device 16, including a cathode-ray tube, is arranged to develop from a composite video-frequency signal applied thereto from the unit 15 a color reproduction of the image being televised. Devices of the type that may be used for such purpose are more fully described in an article entitled "General description of receivers for the dot-sequential color television system which employ direct-view tri-color kinescopes" in the RCA Review for June 1950, at pages 228–232.

There is also coupled to the detector 23 a synchronizing-signal separator 24 having output circuits connected with conventional horizontal and vertical beam-deflecting windings in the unit 16 through line-scanning and field-scanning generators 25 and 26, respectively. An output circuit of the separator 24 is also connected to a color wave-signal generator 27 through a terminal 28 in the unit 15. The output circuit of the AGC supply in the detector 23 is connected to the input circuits of one or more of the tubes of the radio-frequency amplifier 20, the oscillator-modulator 21 and the intermediate-frequency amplifier 22 in a well-known manner.

A sound-signal reproducing unit 29 is also connected to the output circuit of the intermediate-frequency amplifier 22 and may include one or more stages of intermediate-frequency amplification, a sound-signal detector, one or more stages of audio-frequency amplification and a sound-reproducing device.

It will be understood that the units 20–27, inclusive, and 29 comprise a preferred circuit arrangement for the unit 13 of Fig. 1 and that, with the exception of the unit 15, these units may have any conventional construction and design, the details of which are well known in the are rendering a further description thereof unnecessary.

*General operation of receiver of Fig. 2*

Considering briefly the operation of the receiver of Fig. 2 as a whole and assuming for the moment that the unit 15 is a conventional video-frequency signal-translating system, a desired modulated television wave signal including the visual brightness component IL and a color component C mentioned with reference to Fig. 1 is intercepted by the antenna system 14, 14. The signal is selected and amplified in the radio-frequency amplifier 20 and applied to the oscillator-modulator 21 wherein it is converted into an intermediate-frequency signal. The latter signal is then selectively amplified in the unit 22 and supplied to the detector 23 where its modulation components are derived. These modulation components comprise a composite video-frequency signal representative of an image in color and including a first portion IL representative of the visual brightness of the image and a second portion broadly designated as C and representative of the chromaticity of the image, the second portion including a component representative of the relative luminosity of elemental areas of the image. The first and second portions are translated through the unit 15 in a manner to be described more fully hereinafter and applied to the control electrodes of the cathode-ray tube in the device 16 to modulate the intensity of the electron beam therein and to excite the image screen in the tube of the device 16 in a manner representative of the color of the televised image as more fully described in the RCA Review article for June 1950, previously referred to herein.

The synchronizing-signal components of the received signal are separated from the video-frequency components in the separator 24 and are used to synchronize the operation of the line-scanning and field-scanning generators 25 and 26, respectively. These generators supply signals of saw-tooth wave form which are properly synchronized with reference to the transmitted television signal and applied to a pair of deflecting windings for the cathode-ray tube in the device 16, thereby to deflect the cathode-ray beam therein in two directions normal to each other to reproduce on the image screen thereof a color image of the object being televised by the transmitter. There is also derived in the separator 24 a synchronizing signal applied through the terminal 28 to the generator 27 for purposes to be described more fully hereinafter.

The automatic-gain-control or AGC signal derived in the unit 23 is effective to control the amplification of one or more of the units 20, 21 and 22 to maintain the signal input to the detector 23 and to the sound-signal reproducing unit 29 within a relatively narrow range for a wide range of received signal intensities.

The sound-signal modulated wave signal accompanying the desired television wave signal is also intercepted by the antenna system 14, 14 and, after amplification in the amplifier 20 and conversion to an intermediate-frequency signal in the unit 21, it is translated through the amplifier 22 and applied to the sound-signal reproducing unit 29. In the unit 29 it is amplified and the sound-signal modulation components are derived therefrom, these components being further amplified and utilized by the reproducing device in the unit 29 to reproduce sound in a conventional manner.

*Description of signal-translating apparatus of Fig. 2*

Referring now in particular to the signal-translating apparatus 15 embodying one form of the present invention, this apparatus comprises a circuit for supplying the aforementioned composite signal. More specifically, the apparatus includes a signal-translating system responsive to the composite signal for translating a first portion thereof representative of the visual brightness of the image and for translating a signal which is representative of a second portion thereof, specifically, representative of the chromaticity of the image, and which includes components tending to affect the visual brightness of an image reproduced therefrom. For example, for translating the first portion, or visual brightness signal, the system comprises a filter network 33 having a pass band of approximately 0–4 megacycles and having an input circuit coupled through an input terminal 31 to an output circuit of the detector 23 and an output circuit coupled to an inverse modulator 34. The system also comprises, in cascade, a filter network 35, an inverse modulator 36 and a filter network 37 coupled between the input terminal 31 and a synchronous detector 38. Each of the networks 35 and 37 is arranged to have a pass band of approximately 2–4 megacycles. The system also may include a filter network 39 having a pass band of approximately 0–2 megacycles coupled between the terminal 31 and an input circuit of the inverse modulator 36, if the signal translated through the network 35 includes brightness components as well as chromaticity components. If only the latter components are translated through the network 35, then the units 36, 37 and 39 are not required and the output circuit of the unit 35 is directly connected to the detector 38. For purposes of clarity and completeness, the more general of the two arrangements is described herein. The channel including units 35–37, inclusive, and 39 translates a signal which is representative of the second portion of the composite signal, specifically that representative of the chromaticity of the image but including components undesirably tending to affect the brightness of the image.

The signal-translating apparatus also comprises a signal-deriving means coupled to the signal-translating system for deriving from the signal representative of the second portion a control signal which is related to the component representative of the relative luminosity of elemental areas of the image and which includes a component representative of the undesired luminance effects developed by the translated components. More specifically, the signal-deriving means comprises, in cascade, the color wave-signal generator 27, a phase-delay circuit 40, the synchronous detector 38, a filter network 41 having a pass band of approximately 0–2 megacycles, and an adder circuit 42, coupled between the terminal 28 and an input circuit of the modulator 34. The signal-deriving means also includes a reference voltage source 43 coupled to an input circuit of the adder circuit 42 and which has an input circuit coupled to the terminal 31. The generator 27 may be of a conventional sine-wave type arranged to generate a signal in synchronism and phase with the color subcarrier wave signal generated at the transmitter under the control of a signal supplied thereto by the synchronizing-signal separator 24. The phase-delay circuit 40 may be a conventional delay line or similar device and is arranged to delay the phase of the signal generated in the unit 27 by an amount determined by the luminance angle of the chromaticity signal, as will be described more fully hereinafter. The detector 38 may be any conventional type of synchronous phase detector, examples of which are more fully described in the application Serial No. 159,212 previously referred to wherein the phases of two applied signals are compared and a resultant signal derived from any difference therebetween. The adder circuit 42 is a conventional means for combining two input signals in a manner which prevents feedback or undesired cross coupling of the signals in the input circuits. The reference voltage source 43 may be a unidirectional potential source, for example a battery, which has a fixed voltage representative of the relative luminosity for white in the color system being utilized, as described more fully hereinafter. Alternatively, the source 43 may be a means for deriving such unidirectional potential from the composite signal, for example from a predetermined amplitude portion of a synchronizing-signal pulse, if the system is arranged to develop such a potential at the transmitter for derivation at the receiver.

The apparatus also includes a signal-combining device coupled to the signal-translating system and to the signal-deriving means for combining at least the first portion and the control signal to develop a resultant signal which is representative of at least the brightness of the image and which includes components inversely related to the undesired luminosity effects developed by the translated components. More specifically, the apparatus 15 includes the inverse modulator 34 coupled to the network 33 of the signal-translating system and to the adder circuit 42 of the signal-deriving means. A modulator of the type of unit 34 is described more fully hereinafter with reference to Fig. 2*a*.

*Description and explanation of operation of inverse modulator of Fig. 2a*

Referring now to Fig. 2*a*, there is represented a circuit arrangement that may be utilized for either of the inverse modulators 34 or 36 of Fig. 2. Considering this circuit with relation to the unit 34, the terminals 44 and 45 are arranged to be connected to the output circuits of the units 33 and 42, respectively. The terminal 45 is coupled through a phase inverter 46 to a control electrode, specifically the outer control electrode, preferably of the remote cutoff type, of a pentode vacuum tube 48. The level of the signal applied to this outer control electrode is controlled by a resistor 49 connected between the last-mentioned electrode and ground. The input terminal 44 is coupled through a condenser 47 to an inner control electrode of the tube 48.

In a mixer tube of the type having a remote cutoff outer signal grid, such as the tube 48 of Fig. 2*a*, the $e_g$–$i_p$ curve of the remote cutoff grid over a selected portion thereof, closely approximates a hyperbola, that is, a curve in which one coordinate varies as the negative reciprocal of the other, thus representing a negative inverse function. Therefore, if a signal is applied to the remote cutoff grid, there will be developed on the anode a negative inverse reproduction of the applied signal. Since a conventional modulator normally produces an output proportional to the product of the applied signals, if a negative signal is applied to the remote cutoff grid by the phase inverter 46, the operation of the tube 48 is such that the resultant signal developed across the anode load resistor represents the division of the signal applied to the terminal 44 by the signal applied to the terminal 45. Thus the composite signal output of filter network 33 and, specifically, that portion thereof representative of the visual brightness of the image, is divided by the signal applied from the added circuit 42.

*Explanation of operation of signal-translating apparatus of Fig. 2*

In explaining the operation of the apparatus 15 of Fig. 2, a general explanation thereof will first be presented and then there will follow a more detailed explanation of portions thereof. Referring now to the operation of the apparatus 15, there is applied to the terminal 31 and translated through the filter network 33 to an input circuit of the inverse modulator 34 a composite signal which may be designated as $(IL)+(IL)\ [C+C_u]$, this composite signal being more complex than the composite signal $(IL)+[C+C_u]$ of Fig. 1. As used hereinafter, the symbols enclosed by parenthesis ( ) will represent that portion of a signal related to brightness. Brackets [ ] will be used to enclose that portion of a signal related to color. Thus in the expression just presented (IL) is the visual brightness signal and the expression $[C+C_u]$ relates to the chromaticity of the image. In accordance with the invention, it is required that at least the first portion of the composite signal, specifically the portion (IL) representative of the visual brightness of the image, be translated through the network 33. The second portion of the composite signal $(IL)[C+C_u]$ including both chromaticity signals and high-frequency brightness signals is translated through the filter network 35 and applied to an input circuit of the inverse modulator 36. The 0–2 megacycle low-frequency components of the visual brightness signal (IL) are translated through the network 39 and applied to another input circuit of the inverse modulator 36. In the modulator 36, as will be described more fully hereinafter, the signals $(IL)[C+C_u]$ translated through the unit 35 are divided by the signals (IL) translated through the unit 39 to develop a signal $[C+C_u]$ in the output circuit of the modulator which is representative of the chromaticity of the image and does not include brightness components. This chromaticity signal $[C+C_u]$ is translated through the network 37 and applied to an input circuit of the detector 38. As mentioned previously, if the signal translated through the network 35 contains only the chromaticity information $[C+C_u]$, as described with reference to Fig. 1, the units 36, 37 and 39 may be omitted, the chromaticity signal $[C+C_u]$ being applied directly to the detector 38. The development of signals of this and of other types will be described more fully hereinafter with reference to the transmitter of Fig. 4.

The signal developed by the generator 27 is delayed in phase in the unit 40 by a certain amount, as described hereinafter, and is applied to another input circuit of the detector 38. The detector 38 effectively samples the signal $[C+C_u]$ applied thereto from the network 37 at a phase angle related to the phase delay of the sampling signal applied to the unit 38 from the generator 27 to derive a control signal $[L_c+L_{cu}]$. The latter signal is related to that component of the chromaticity signal which is representative of the relative luminosity $L_c$ of the elemental areas of the image and which also includes a component $L_{cu}$ representative of the undesired luminosity effects developed by the undesired color signal $[C_u]$ in the chromaticity signal. The low-frequency components of this control signal $[L_c+L_{cu}]$ representative of that portion of the luminosity component related to chromaticity are translated through the network 41 and combined in the adder circuit 42 with a signal $L_w$ developed in the unit 43 and which represents the luminosity of white in the system being employed. The resultant signal $L+L_u$, representing the relative luminosity of elemental areas of the image plus the relative luminosity or visual brightness effects of the undesired components in the color channel, is then applied as a control signal to the input circuit of the inverse modulator 34. In the unit 34 the composite signal, or at least the first portion thereof, is divided by the control signal applied from the adder circuit 42 to develop a resultant signal which is translated through the terminal 32 and applied to the input circuit of the image-reproducing device 16. The division may be expressed mathematically as follows:

$$\left(\frac{IL}{L+L_u}\right)+\left[\frac{ILC+ILC_u}{L+L_u}\right] \qquad (1)$$

This resultant signal is representative of at least the visual brightness (IL) of the image being reproduced and includes components $1/L_u$ which are inversely related to the undesired visual brightness effects developed by the components in the color channel so that, as explained with reference to Fig. 1, the first portion of the composite signal is primarily representative of visual brightness B and the second portion is primarily representative of the chromaticity C″ of the image, the component $1/L_u$ effectively eliminating any visual brightness changes developed by the chromaticity signal because of the presence of any undesired color components therein. If there are no undesired color components $C_u$ present, it is seen that:

$$\left(\frac{IL}{L+L_u}\right)+\left[\frac{ILC+ILC_u}{L+L_u}\right] \text{ reduces to } (I)+[IC] \quad (2)$$

If there are undesired color components $C_u$ present, resulting in the development of a factor $L_u$ effectively occurring in the numerators of the two parts of the above expression, then the factor $L_u$ in the denominators thereof effectively cancels therewith. It is to be understood that $L_u$ effectively occurs in the numerators due to the electrical and optical effects of the component $C_u$.

To understand the invention, it is helpful to examine in more detail the manner in which the primary colors green, red and blue are utilized to translate and reproduce the chromaticity of a televised image. Referring now to Fig. 3, there is represented a color diagram in triangular form having the color primaries at the points of the triangle. This triangle represents that area of the color spectrum which the primaries green, designated by G, red, designated by R, and blue, designated by B, each comprising a specific band of wave lengths, are capable of reproducing. More details with respect to such a triangle may be found in a three-part article entitled "Color fundamentals for TV engineers" by Donald G. Fink, "Electronics," December 1950–February 1951, and, specifically, on page 83 of the January 1951 issue. The circle enclosing the triangle GRB represents the cyclic phases in which the colors G, R and B modulate the subcarrier wave signal, green being assumed to modulate at zero phase, red at 120° and blue at 240° of a cycle of the subcarrier wave signal. As previously described, the colors G, R and B each have relative luminosity, determined by the relative brightness contributions of equal energy amounts of each color combined to form white. For one particular set of such primaries, green has a relative luminosity of 0.59, red a relative luminosity of 0.34, and blue 0.07 and a white signal W, represented at the center of the triangle will be reproduced by the combination of equal amounts of these colors. The white signal W also has a relative luminosity depending upon the relative luminosities of the green, red and blue signals and this factor is fixed for a given set of primaries.

It is seen that luminosity, in general, is a factor related to the brightness sensations produced in the eye by the different colors. Thus, if a line A is drawn from the point of the triangle R to a point on the side of the triangle BG having the same relative luminosity, that is, 0.34, all colors represented by the line A will have equal relative luminosities and, therefore, any change from one color to another along the line will produce no change in visual brightness, since there is no change in the relative luminosity. If there is erected a line V normal to that line, for example, through the point W, such a line then represents the maximum variation in luminosity for all colors defined by the triangle GRB. If the line V is drawn to intersect the circle representing the sampling cycle, it is seen that there is a phase angle of the modulated subcarrier wave signal which represents the variation in brightness for the color represented by each cycle of the subcarrier wave signal, that is, the color for each elemental area of the image. Since the present invention is directed to having color signals produce the least visible brightness disturbance in the reproduced image, it is proposed in accordance with the present invention that in each cycle of the subcarrier wave signal there be derived at the angle $\theta$ of the line V a control signal which represents the relative luminosity of the color being transmitted during that cycle and also the luminance effects of any color components that have been developed which undesirably affect the brightness of an image reproduced therefrom.

In view of the above, in order to derive the luminosity control signal $[L_c+L_{cu}]$ at the angle $\theta$, the phase-delay circuit 40 is proportioned to cause the detector 38 to sample the chromaticity signal applied thereto from the unit 37 at the angle $\theta$. The control signal $[L_c+L_{cu}]$ is proportional to the relative luminosity for each elemental area of the image and inherently includes not only the relative luminosity effects $L_c$ caused by the televised color of the image but also includes the undesired relative luminosity effects $L_{cu}$ caused by the color signal. Since this control signal is only representative of the relative luminosity $[L_c+L_{cu}]$ of the area contributed by the color, the signal $[L_c+L_{cu}]$ is combined with the luminosity signal $L_w$ for white in the unit 42 to develop the complete control signal $L+L_u$. The latter control signal, as has been described, combines with the brightness signal in the inverse modulator 34 to develop the desired brightness result in the image reproduced by the device 16.

By means of the arrangement described, any undesired visual effects produced by the color-signal components in the reproducing device may be effectively canceled by such employment of the luminosity component $L_u$ representative of the undesired visual brightness of the color components inversely in the brightness channel of the system by means of the inverse modulator 34.

*Description of color-television transmitter of Fig. 4*

In order that a receiver in accordance with the present invention be operative, it is necessary that complementary operations occur at the transmitter and the receiver of the color-television system. The arrangement at a receiver of the system, to develop a control signal which is effective in diminishing the undesired visual brightness effects produced by the color components developed in the system, has been described above. An operation complementary to the inverse modulation at the receiver is required at the transmitter in order that the signals in the output of the inverse modulator in the receiver circuit will faithfully represent the brightness and the chromaticity of the televised image. The composite video-frequency signal conventially developed in a color-television receiver is here modulated in terms of the relative luminosity of the signals which compose the composite video-frequency signal. The transmitter represented by Fig. 4 provides an arrangement to effect such modulation.

Referring now to Fig. 4, the transmitter represented therein comprises a signal-developing apparatus 50 which is arranged to develop color signals related to corresponding colors of an image being televised and including brightness information with relation thereto. The apparatus 50 may include television cameras and related equipment conventionally used to develop color signals of the type described. The equipment in the apparatus 50 utilized for timing the operation of the cameras is also coupled to a color wave-signal generator 51 and to an output amplifier 52. Individual output circuits of the apparatus 50, supplying the 0–4 megacycle red, green and blue color signals, are coupled to individual ones of filter networks 53a, 53b and 53c, each having a pass band of approximately 0–2 megacycles, and to individual ones of amplifiers 54a, 54b and 54c. These individual output circuits are also collectively coupled to an adder circuit 55. Individual ones of the networks 53a–53c, inclusive, are coupled to synchronous modulators 56a, 56b and 56c, respectively, the output circuits of which are individually coupled to input circuits of an adder circuit 57. Coupled in cascade to the output circuit of the unit 57, and in the order named, are an inverse modulator 58, a modulator 59, a filter network 60 having a pass band of approximately 2–4 megacycles, an adder circuit 61, the amplifier 52 and a signal-transmission apparatus 62 having the antenna system 11, 11. The inverse modulator 58 may be of the type illustrated in Fig. 2 and described above. The apparatus 62 may be of a conventional type including a wave-signal modulation circuit, power amplifier, and the antenna means 11, 11 for radiating the modulated wave signal.

The output of the generator 51 is coupled directly to the modulator **56*a* and through delay lines 63*b* and 63*c* to the modulators 56*b* and 56*c*, respectively. The delay lines 63*b* and 63*c* are proportioned to delay the signal generated in the unit 51 by 120° and 240°, respectively, to effect modulation of the signal generated in the unit 51 at different phase points thereon as previously mentioned. The adder circuit 55 is connected, through a filter network 64 having a pass band of approximately 0–2 megacycles, to an input circuit of the inverse modulator 58. Individual output circuits of the amplifiers 54*a*–54*c*, inclusive, are coupled to individual input circuits of an adder circuit 65, the output circuit of which is coupled through a filter network 66 having a pass band of approximately 0–4 megacycles, to an input circuit of the adder circuit 61 and through a filter network 67 having a pass band of approximately 0–2 megacycles to an input circuit of the modulator 59**.

The amplifiers **54*a*–54*c*, inclusive, are so proportioned that each has a gain representative of the relative luminosity of the color represented by the signal being translated therethrough. Thus, if the amplifiers 54*a*–54*c*, inclusive, are arranged individually to translate signals representative of the green, red and blue characteristics of the image, respectively, the gains of these amplifiers would be adjusted in the ratio of 0.59, 0.34 and 0.07 if the primary colors discussed with reference to Fig. 3 are utilized. The synchronous modulators 56*a*–56*c*, inclusive, may be of a type described in the copending application Serial No. 159,212 previously mentioned herein. Specifically, they are arranged to effect modulation of the subcarrier wave signal developed in the unit 51 by the individual color signals translated through the units 53*a*–53*c*, inclusive, at phase points on the subcarrier wave signal of 0°, 120° and 240°, respectively. The adder circuits 55, 57, 61 and 65** may be of any conventional type for combining the signals applied to the input circuits thereof in an additive manner.

*Explanation of operation of color-television transmitter of Fig. 4*

Considering now the operation of the transmitter of Fig. 4, color wave signals related to the basic color characteristics of the televised image, specifically related to the colors green, red and blue thereof, are developed in the apparatus 50 in any conventional manner. These signals are then individually applied to the networks **53*a*–53*c*, inclusive, translated therethrough and individually applied to the modulators 56*a*–56*c*, inclusive. In the modulators 56*a*–56*c*, inclusive, the signals modulate the subcarrier wave signal applied thereto by the generator 51 at different phase positions thereon, specifically at 0° phase in the modulator 56*a*, at 120° in the modulator 56*b* and at 240° in the modulator 56*c*. The 120° and 240° phase delays of the signal generated in the unit 51 are effected by the delay lines 63*b* and 63*c*, respectively. The output signals of the modulators 56*a*–56*c*, inclusive, are combined additively in the circuit 57 and applied to an input circuit of the inverse modulator 58**.

The color signals developed in the output circuits of the apparatus 50 are also individually applied to the amplifiers **54*a*–54*c*, inclusive, wherein the amplitudes of the signals related to the green, red and blue characteristics of the image are controlled in proportion to the relative luminosity of these colors. The output signals of the amplifiers 54*a*–54*c*, inclusive, are combined additively in the circuit 65 to form the visual brightness signal represented by the term (IL) considered with reference to Fig. 1. The signal (IL) is translated through the network 66 and applied to an input circuit of the adder circuit 61. A 0–2 megacycle portion of this signal is also translated through the network 67 and applied to an input circuit of the modulator 59**.

The individual color signals in the output circuit of the apparatus 50 are also applied to the adder circuit 55 wherein they are combined additively to develop a signal (I) representative of the brightness of the image. The signal (I) is composed of equal amounts of the green, red and blue color signals regardless of their relative luminosity, that is, the sensitivity of the eye to the brightness of these signals, and the 0–2 megacycle component thereof is translated through the network 64 and applied to an input circuit of the inverse modulator 58. The signal applied to the modulator 58 from the adder circuit 57 represents the chromaticity [C] of the image but also includes a 0–2 megacycle brightness component (I) and, thus, may be designated by the term [IC]. In the inverse modulator 58 the component (I) is canceled therefrom as a result of the division thereof by the signal (I) translated through the network 64 and, as a result, a signal [C] representative solely of the chromaticity of the image is developed in the output circuit of the modulator 58 and applied to the input circuit of the modulator 59. In the modulator 59 the chromaticity signal [C] is modulated by the visual brightness signal (IL) translated through the network 67 and there is developed in the output circuit thereof a signal designated (IL) [C] and representative of the product of the chromaticity signal and the visual brightness signal. The 2–4 megacycle portions of this signal, including the color subcarrier and at least a portion of the side bands thereof, are translated through the network 60 and combined in the adder circuit 61 with the visual brightness signal (IL) translated through the network 66 to form the composite video-frequency signal $(IL)+(IL)[C]$ previously considered with respect to the receiver of Fig. 2. This composite video-frequency signal is further amplified in the amplifier 52 and combined therein with the synchronizing signals developed in the unit 50 to form a signal including both video-frequency and synchronizing information. The latter signal is utilized to modulate a carrier-wave signal in the apparatus 62 and is radiated as a television signal by the antenna system 11, 11.

It is thus seen that the transmitter of Fig. 4 is arranged to develop a composite video-frequency signal in which the color and brightness components thereof are proportioned in terms of the relative luminosity of the colors which combine to compose this signal. In this manner, an inverse operation can occur at the receiver, as previously described with reference to Fig. 2, without affecting the fidelity of the color and brightness signals. By such inverse operation at the receiver, the undesired brightness effects previously discussed are greatly diminished and the color-television system is more effective in presenting an acceptable reproduction of the televised image.

In considering the transmitter of Fig. 4, the manner in which a comopsite video-frequency signal, proportioned in terms of the relative luminosity of its components, is developed, has been described and explained. It should be understood that composite video-frequency signals other than the one described may be developed and utilized, depending on the system and mode of signal translation selected. Thus, only the monochrome component may be proportioned in terms of the relative luminosity of the components to form the signal (IL) and the chromaticity component [C] combined therewith in the unit 61 to develop a composite video-frequency signal $(IL)+[C]$. In such case, the filter network 67 and the modulator 59 are omitted at the transmitter, and the receiver is correspondingly simplified as described with reference to Fig. 2. Similarly, if desired, the chromaticity signal may be [IC] and the adder circuit 55, the filter network 64, the inverse modulator 58, the modulator 59 and the filter network 67 may be omitted but this requires a more complex arrangement at the receiver to eliminate the brightness component (I) from the color signal in order to derive the $[L_c+L_{cu}]$ signal. The manner in which such brightness component may be eliminated by including units at the receiver to derive the component (I) from the brightness signal and an inverse modulator to eliminate the brightness component (I) from the color is understandable from similar operations described herein. Other possibilities are equally evident, being limited only by the need to proportion the brightness signal at the transmitter in terms of L and to derive from the color signal at the receiver either directly or indirectly a signal representative of $L+L_u$.

*Description of signal-translating apparatus of Fig. 5*

With respect to the receiver of Fig. 2, there has been described a signal-translating apparatus by means of which a signal, proportional to the relative luminosity of elemental areas of the reproduced image and including a control signal related to the visual brightness effects developed by components of the chromaticity signal, can be derived. The derived relative luminosity signal is then employed in combination with the visual brightness signal to effect a reduction in the undesired visual brightness effects caused by color-signal components. To obtain the derived relative luminosity signal $L+L_u$ in the apparatus there described, a luminance factor $[L_c+L_{cu}]$ related solely to the chromaticity of the image was first derived and added to a fixed luminosity factor $L_w$ related to white for the color primaries being employed in the system to obtain the control signal $L+L_u$. The apparatus of Fig. 5 presents an arrangement wherein the signal $L+L_u$ may be directly derived from the composite video-frequency signal thus simplifying the signal-translating apparatus. Since the apparatus of Fig. 5 is related to the apparatus of Fig. 2, similar units in both embodiments are designated by the same reference numerals and analogous units by the same reference numerals with a factor of 500 added thereto.

In the apparatus of Fig. 5, the filter network 33 is coupled between the input terminal 31 and an input circuit of an amplifier or modulator 70. The output circuit of the filter network 39 is coupled through a pair of series-connected resistors 71 and 72 to ground. The junction point of the resistors 71 and 72 is directly connected to another input circuit of the amplifier 70 and through a resistor 73 to an output circuit of an amplifier 74. The resistors 71–73, inclusive, form a signal-combining circuit. There is provided a filter network 75 having a nonlinear frequency-response characteristic over a pass band of approximately 0–4 megacycles, the response being substantially uniform in the region of 0–2 megacycles and substantially uniform in the region of 2–4 megacycles but of different values in these two regions as will be considered more fully hereinafter. The network 75 is coupled between the input terminal 31 and an input circuit of the sampling device 538. The sampling device 538 is similar in structure to the synchronous detector in the apparatus 15 of Fig. 2 except that it operates more in the nature of an electronic switch to select a portion of the 0–4 megacycle signal translated through the network 75 at a time determined by the signal from the generator 27. The output circuit of the network 41 is connected to an input circuit of the amplifier 74, another input circuit of which is connected to the junction of resistors 71 and 72 and to an input circuit of the amplifier 70. The output circuit of the amplifier 70 is connected to the terminal 32.

The pass band of the network 75 is proportioned to translate the 0–2 megacycle portion of the signal applied thereto so that the response of the network with respect to this portion is representative of $L_w$ and the response with respect to the 2–4 megacycle portion is representative of $L_c$, where both $L_w$ and $L_c$ have the same scale factor. The scale factors of the monochrome and subcarrier signals are normally different, due to an arbitrary relationship between the maximum amplitude of the color subcarrier wave signal and the brightness signal utilized in the system and developed at the transmitter when the color and brightness signals are combined. The relative responses of the two portions of the 0–4 megacycle signal may differ by a factor $x$ and the composite signal can be expressed as:

$$(IL)+x(IL)[C] \qquad (3)$$

Since the amplitude of the signal (IL) is to be representative of $L_w$ and the signal $x(IL)[C]$, when sampled at the luminance angle $\theta$, is to have an amplitude representative of $L_c$, both $L_w$ and $L_c$ having the same scale factor, it is seen that:

$$(IL)L_w+x(IL)\frac{L_c}{x}=(IL)L \qquad (4)$$

and that if the response of the portion of the channel through which the 0–2 megacycle portion is translated is assumed to be related to $L_w$, the response of the portion through which the signal component including $L_c$ is translated should be $$\frac{1}{x}$$

and the ratio of the responses in the two portions is $$\frac{1}{xL_w}$$

More specifically, for a system of the type being described with one specific set of receiver color primaries, the response of the channel through which the signal representative of $L_c$ is translated should be approximately ⅞ of the response of the 0–2 megacycle channel. Assuming that $x=1$ at the transmitter and all channels other than the network 75 through which the two portions of the signal are translated have uniform response for all 0–4 megacycle signals, the pass band of the network 75 is proportioned to have unity response for the 0–2 megacycle portion and 0.875 response for the 2–4 megacycle portion.

Each of the amplifiers 70 and 74 is a conventional variable-gain type effectively operating as a modulator, the gain thereof being controlled by an applied signal effectively to multiply the applied signal by another applied signal. Because of this function, these amplifiers may be designated as modulators. Any conventional amplifier of this type, being well known in the art, may be employed.

*Explanation of operation of signal-translating apparatus of Fig. 5*

Considering now the operation of the apparatus of Fig. 5, the composite video-frequency signal is applied to the terminal 31, translated through the network 33 and applied to the input circuit of the amplifier 70. As described with reference to the apparatus of Fig. 2, this signal includes at least a first portion representative of the brightness of the image. Specifically, it includes such portion and a second portion, the latter portion being representative of the color or chromaticity of the image. A low-frequency portion representative of the brightness of the image and designated (IL) is translated through the network 39 and is developed across the resistors 71 and 72. The composite video-frequency signal, having the 0–2 megacycle and the 2–4 megacycle portions thereof differently translated in the manner previously described, is translated through the filter network 75 and applied to the sampling device 538 wherein, by means of the signal applied from the generator 27 as previously described, a signal representative of the luminosity of each of the elemental areas of the image is derived. This signal also includes the brightness component (IL) and, therefore, has the form $(IL)(L+L_u)$.

The latter signal is translated through the network 41 and applied to the amplifier 74.

The amplifier 74 during the initial instant of operation develops in the output circuit thereof, in a conventional manner, the signal $-(IL)(L+L_u)(A)$, where A represents the gain of the amplifier 74. The latter signal is translated through the resistor 73 and develops a potential across the resistor 72. The signal (IL) translated through the network 39 and the signal $-(IL)(L+L_u)(A)$ translated through the amplifier 74 combine to develop a resultant signal which controls the gain A of the amplifiers 70 and 74. This resultant signal is of such a nature that it tends to make the signals (IL) and $-(IL)(L+L_u)(A)$ equal. As a result, the amplifiers 70 and 74 are controlled so that each has a gain:

$$(A)=\frac{1}{L+L_u}$$

Thus, as the composite video-frequency signal is translated through the amplifier 70, it effectively is divided by the signal $L+L_u$ and becomes an output signal similar to that described with reference to the apparatus 15 of Fig. 2. This signal may then be used in an image-reproducing device in the manner previously described with reference to the apparatus of Fig. 2.

*Description of apparatus of Fig. 6*

The apparatus of Fig. 6 represents another and somewhat simpler arrangement for accomplishing the objects of the invention, some features of which are more fully described in applicant's copending application entitled "Color-Television Signal-Translating System," Serial No. 262,309, filed December 18, 1951. Since the apparatus represented by Figs. 2, 5 and 6 of the present application are related, similar units in each thereof are designated by the same reference numerals and analogous units of Fig. 6 by the same reference numerals as used with respect to Fig. 2 with a factor of 600 added thereto.

The terminals 30, 30, being a pair of input terminals to the apparatus of Fig. 6, are arranged to be coupled to a pair of terminals such as the terminals 30, 30 in the output circuit of the intermediate-frequency amplifier 22 of Fig. 2. Coupled in cascade with the terminals 30, 30 are an intermediate-frequency amplifier 80, an adder circuit 81, an amplifier 670, a band-pass filter network 82 having a pass band determined by the intermediate-frequency color subcarrier and its side bands, for example of 22–24 megacycles, and an amplifier 83. There are also coupled in cascade with the terminals 30, 30 a synchronizing-signal detector 84, a color wave-signal generator 627, a phase-delay circuit 640, a sampling device 638 and the filter network 41, the output of the network 41 being coupled to an input circuit of the adder circuit 81. The synchronizing-signal detector 84 is arranged to derive a synchronizing control signal for the generator 627. The generator 627 has elements so proportioned as to develop a wave signal having a frequency related to the intermediate frequency of the amplifier, for example a frequency of 22.5 megacycles, and, in some applications as described in the inventor's copending application referred to above, the intermediate-frequency signal itself, having a frequency, for example, of 26 megacycles, may be employed instead of utilizing a local generator such as the unit 627. For this reason, the units 84 and 627 are shown as being connected to the terminal 30 and to the unit 638, respectively, by dashed-line construction to indicate that they may or may not be present. If these units are omitted, a frequency-selective network for selecting the intermediate-frequency signal may be employed. The sampling device 638 is arranged to operate at the intermediate frequency and, except for the difference in the frequency of operation, is similar to the device 538 of Fig. 5.

A low-pass filter network 85 having a pass band such that the intermediate-frequency color subcarrier signal and its side bands are not translated therethrough while the signal $-(IL)(L+L_u)(A)$ is translated therethrough is coupled between the output circuit of the amplifier 670 and the resistors 73 and 72. The output circuit of the band-pass filter network 82 is coupled to ground through a pair of series-connected resistors 86 and 87 while an amplitude detector 89 is coupled from the output circuit of amplifier 670 to the junction of the resistors 86 and 87.

The apparatus of Fig. 6 is arranged to utilize a signal of the type developed in the network 75 of Fig. 5, which signal may be locally developed by means of a filter network having a nonuniform frequency-response characteristic, such as the unit 75 of Fig. 5, or it may be developed at the transmitter in the system. With respect to the apparatus of Fig. 6, it is assumed that such a signal has been developed at the transmitter and is applied to the terminals 30, 30 as a modulation signal of a subcarrier wave signal having a frequency in the intermediate-frequency band of the receiver.

*Explanation of operation of apparatus of Fig. 6*

Considering now the operation of the apparatus of Fig. 6, the intermediate-frequency signal modulated by the 0–4 megacycle composite video-frequency signal is applied to the sampling device 638 wherein, at the proper phase in each cycle of the intermediate-frequency subcarrier, a control signal, related to the luminosity of an elemental area of the reproduced image and having the form $(IL)(L+L_u)$, is derived. This signal is translated through the network 41 and combined in the adder circuit 81 with the modulated intermediate-frequency signal translated through the amplifier 80. It will be seen that the signals translated through the unit 80 and the unit 41 will occupy different portions of the frequency spectrum. These two bands of signals are then translated simultaneously through the amplifier 670, and the low-frequency portion, specifically the 0–2 megacycle portion of the signal translated therethrough, is translated through the network 85 and appears in the output circuit thereof in the form of the signal $-(IL)(L+L_u)(A)$. This signal combines with the signal translated through the network 39 to control the gain (A) of the amplifier 670 in the manner previously described with reference to the apparatus of Fig. 5. Thus, the signal translated through the band-pass filter network 82 and the amplitude detector 89 is a corrected signal of the type previously described, modified by a control signal related to the luminosity inversely combined therewith. The band-pass filter network 82 translates only the intermediate-frequency color subcarrier wave signal and its side bands, specifically a signal having a band width of 22–24 megacycles. The amplitude detector 89 derives a signal related to the brightness of the image modified by the control signal developed by the controlled gain of the amplifier 670. The signals translated through the network 82 and the detector 89 are simultaneously developed across the resistors 86, 87 and translated through the amplifier 83. They are then applied through the terminal 32 to the image-reproducing device in the manner described more fully in applicant's last-mentioned copending application. The combined signals are similar to the previously described composite video-frequency signal except that the present composite signal is of intermediate frequency and a sampling frequency in the intermediate-frequency range is employed in the image-reproducing device instead of a sampling frequency within the 0–4 megacycle video-frequency band.

There have been described herein systems by means of which undesired brightness effects caused by undesired color components of the color image and by the lack of uniform sensitivity of the eye to all colors may be diminished. The diminishing of these effects is accomplished at the receiver by deriving from the chromaticity signal, or from the chromaticity signal and the brightness signal, a signal which is related to the relative luminosity of elemental areas of the reproduced image. This latter signal includes a component related to the undesired relative luminosity of the color components and is combined with the brightness component of the composite video-frequency signal in such a manner that it will offset in the reproduced image the brightness effects caused by such color components when the image is viewed by the eye. It should be understood that the composition of the composite video-frequency signal is in general not pertinent to the invention and any number of different compositions may be employed, provided that the brightness component of the composite video-frequency signal is proportioned in terms of relative luminosity at the transmitter and a luminosity-type signal is derived at the receiver and combined inversely with the proportioned brightness component.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Signal-translating apparatus for a color-television receiver which utilizes a color image-reproducing device for reproducing an image from a predetermined group of primary colors comprising: a circuit for supplying a composite television signal representative of a color image and including a first portion having a band width of greater than 0–2 megacycles representative of the visual brightness thereof and a second portion having a subcarrier wave signal having a specific band width and modulated by at least a signal representative of the chromaticity of the image, said chromaticity signal undesirably tending to affect the luminance in an image reproduced by the device; signal-deriving means coupled to the supply circuit and including a network for translating said modulated subcarrier wave signal for deriving from a specific phase thereof a control signal representative of the undesired luminance effects of said chromaticity signal; a signal-combining device coupled to said supply circuit and said deriving means and responsive jointly to at least said first portion and said control signal to develop a resultant signal which is representative of at least the visual brightness of said image and which includes a component inversely related to said undesired luminance effects; and means for utilizing said resultant signal and said subcarrier wave signal in the image-reproducing device to reproduce said image, whereby said first portion is effective primarily to determine the visual brightness of said image and said second portion is effective primarily to determine the chromaticity of said image with any brightness changes due to said undesired luminance effects being effectively eliminated.

2. Signal-translating apparatus for a color-television receiver which utilizes a color image-reproducing device for reproducing an image from a predetermined group of primary colors comprising: a circuit for supplying a composite television signal representative of a color image and including a first signal having a band width of greater than 0–2 megacycles representative of the visual brightness thereof and a second subcarrier wave signal having a band width of more than 1 megacycle and modulated at a predetermined phase by at least a signal representative of the chromaticity of the image, said chromaticity signal underisably tending to affect the luminance in an image reproduced by the device; signal-deriving means coupled to the supply circuit and including a network having a pass band substantially equal to said band width of said subcarrier wave signal for translating said modulated subcarrier wave signal for deriving from said predetermined phase thereof a control signal representative of the undesired luminance effects of said chromaticity signal; a signal-combining device coupled to said supply circuit and said deriving means and responsive jointly to at least said first signal and said control signal to develop a resultant signal which is representative of at least the visual brightness of said image and which includes a component inversely related to said undesired luminance effects; and means for applying said resultant signal and said subcarrier wave signal to the image-reproducing device to reproduce said image, whereby said first signal is effective primarily to determine the visual brightness of said image and said second signal is effective primarily to determine the chromaticity of said image with any brightness changes due to said undesired luminance effects being effectively eliminated.

3. Signal-translating apparatus for a color-television receiver which utilizes a color image-reproducing device for reproducing an image from a predetermined group of primary colors comprising: a circuit for supplying a composite television signal representative of a color image and including a first signal having a band width of approximately 0–4 megacycles representative of the visual brightness thereof and a second subcarrier wave signal having a band width of approximately 2–4 megacycles and modulated at a predetermined phase by at least a signal representative of the chromaticity of the image, said chromaticity signal undesirably tending to affect the luminance in an image reproduced by the device; signal-deriving means coupled to the supply circuit and including a band-pass filter network for translating said modulated subcarrier wave signal and for deriving therefrom at said predetermined phase thereof a control signal representative of the undesired luminance effects of said chromaticity signal; a signal-combining device coupled to said supply circuit and said deriving means and responsive jointly to at least said first signal and said control signal to develop a resultant signal which is representative of at least the visual brightness of said image and which includes a component inversely related to said undesired luminance effects; and means for applying said resultant signal and said subcarrier wave signal to the image-reproducing device to reproduce said image, whereby said first signal is effective primarily to determine the visual brightness of said image and said second signal is effective primarily to determine the chromaticity of said image with any brightness changes due to said undesired luminance effects being effectively eliminated.

4. Signal-translating apparatus for a color-television receiver which utilizes a color image-reproducing device for reproducing an image from a predetermined group of primary colors comprising: a circuit for supplying a composite television signal representative of a color image and including a first portion representative of the visual brightness thereof and a second portion having a subcarrier wave signal modulated by at least a signal representative of the chromaticity of the image, said wave signal as supplied having a component representative of at least a fraction of the luminance in an image reproduced by the device and undesirably tending to affect the luminance in the image; signal-deriving means coupled to the supply circuit for deriving from said modulated subcarrier wave signal a control signal including said component and representative of the undesired luminance effects; a signal-combining device coupled to said supply circuit and said deriving means and responsive jointly to at least said first portion and said control signal to develop a resultant signal which is representative of at least the visual brightness of said image and which includes a component inversely related to said undesired luminance effects; and means for applying said resultant signal and said subcarrier wave signal to the image-reproducing device to reproduce said image, whereby said resultant signal is representative of the visual brightness of said image and any brightness changes due to said undesired luminance effects are effectively eliminated.

5. A color-television system comprising: a transmitter including means for developing at least a first signal primarily representative of the visual brightness of an image and substantially independent of its chromaticity, means for developing a subcarrier wave signal modulated by at least a signal which is primarily representative of the chromaticity of said image said modulated subcarrier wave signal including a component representative of the relative luminosity of elemental areas of the image, means for combining said developed signals to form a composite signal, and means for transmitting said composite signal; and a receiver for said transmitted signals including a signal-translating system for translating a first portion of said composite signal representative of said first signal and for translating a second portion representative of said modulated subcarrier wave signal, said second portion tending to include undesired components affecting the visual brightness in a reproduction of said image, including signal-deriving means coupled to said signal-translating system for deriving from said second portion a control signal which is related to said component representative of said relative luminosity and which includes a component representative of the luminance effects developed by said undesired components, including a signal-combining device coupled to said signal-translating system and said signal-deriving means and responsive jointly to at least said first portion and said control signal to develop a resultant signal which is representative of at least the brightness of said image and which includes components inversely related to said luminance effects developed by said undesired components, and means for utilizing said resultant signal and said subcarrier wave signal to reproduce said image, whereby said resultant signal determines the brightness of said reproduction of said image and simultaneously substantially reduces any brightness changes which said second portion tends to produce therein.

6. A color-television system comprising: a transmitter including a first signal-translating channel having a plurality of amplifiers for developing at least a first signal primarily representative of the visual brightness of an image and substantially independent of its chromaticity, means for developing a subcarrier wave signal modulated by at least a signal which is primarily representative of the chromaticity of said image said modulated subcarrier wave signal including a component representative of the relative luminosity of elemental areas of the image, means for combining said developed signals to form a composite signal, and means for transmitting said composite signal; and a receiver for said transmitted signals including a signal-translating system for translating a first portion of said composite signal representative of said first signal and for translating a second portion representative of said modulated subcarrier wave signal, said second portion tending to include undesired components affecting the visual brightness in a reproduction of said image, including signal-deriving means coupled to said signal-translating system for deriving from said second portion a control signal which is related to said component representative of said relative luminosity and which includes a component representative of the luminance effects developed by said undesired components, a modulator device coupled to said signal-translating system and said signal-deriving means and responsive jointly to at least said first portion and said control signal to develop a resultant signal which is representative of at least the brightness of said image and which includes components inversely related to said luminance effects developed by said undesired components, and means for utilizing said resultant signal and said subcarrier wave signal to reproduce said image, whereby said resultant signal determines the brightness of said reproduction of said image and simultaneously substantially reduces any brightness changes which said second portion tends to produce therein.

7. A color-television system comprising: a transmitter including means for developing at least a first signal primarily representative of the visual brightness of an image and substantially independent of its chromaticity, means including a plurality of modulators, and an inverse modulator for developing a subcarrier wave signal modulated by at least a signal which is primarily representative of the chromaticity of said image said modulated subcarrier wave signal including a component representative of the relative luminosity of elemental areas of the image, means for combining said developed signals to form a composite signal, and means for transmitting said composite signal; and a receiver for said transmitted signals including a signal-translating system for translating a first portion of said composite signal representative of said first signal and for translating a second portion representative of said modulated subcarrier wave signal, said second portion tending to include undesired components affecting the visual brightness in a reproduction of said image, including signal-deriving means coupled to said signal-translating system for deriving from said second portion a control signal which is related to said component representative of said relative luminosity and which includes a component representative of the luminance effects developed by said undesired components, a modulator device coupled to said signal-translating system and said signal-deriving means and responsive jointly to at least said first portion and said control signal to develop a resultant signal which is representative of at least the brightness of said image and which includes components inversely related to said luminance effects developed by said undesired components, and means for utilizing said resultant signal and said subcarrier wave signal to reproduce said image, whereby said resultant signal determines the brightness of said reproduction of said image and simultaneously substantially reduces any brightness changes which said second portion tends to produce therein.

8. In a color-television receiver, apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image, comprising: a signal-translating system responsive to said composite signal for translating at least said first portion and for translating a modulated signal which is representative of said modulated subcarrier wave signal and which includes undesired components tending to affect the visual brightness of said image; signal-deriving means coupled to said system for deriving from said translated modulated signal a control signal which is related to said component representative of said relative luminosity and which includes a component representative of the relative luminosity effects developed by said undesired components; a signal-combining device coupled to said system and said signal-deriving means and responsive jointly to at least said first portion and said control signal to develop a resultant signal which is representative of at least the brightness of said image and which includes components inversely related to said luminosity effects developed by said undesired components; and means for utilizing said resultant signal and said subcarrier wave signal to reproduce said image, whereby said resultant signal is representative of the brightness of said image with any brightness changes due to said undesired components being effectively eliminated.

9. In a color-television receiver, apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image, comprising: a signal-translating system responsive to said composite signal for translating at least said first portion and for translating a modulated signal which is representative of said modulated subcarrier wave signal and which includes undesired components tending to affect the visual brightness of said image; signal-deriving means coupled to said system and including a signal generator and a detector for deriving from said translated modulated signal a control signal which is related to said component representative of said relative luminosity and which includes a component representative of the relative luminosity effects developed by said undesired components; a signal-combining device coupled to said system and said signal-deriving means and responsive jointly to at least said first portion and said control signal to develop a resultant signal which is representative of at least the brightness of said image and which includes components inversely related to said luminosity effects developed by said undesired components; and means for utilizing said resultant signal and said subcarrier wave signal to reproduce said image, whereby said resultant signal is representative of the brightness of said image with any brightness changes due to said undesired components being effectively eliminated.

10. In a color-television receiver, apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image, comprising: a signal-translating system responsive to said composite signal for translating at least said first portion and for translating a modulated signal which is representative of said modulated subcarrier wave signal and which includes undesired components tending to affect the visual brightness of said image; signal-deriving means coupled to said system and including a phase detector for deriving from said translated modulated signal at a predetermined phase thereof a control signal which is related to said component representative of said relative luminosity and which includes a component representative of the relative luminosity effects developed by said undesired components; a modulator device coupled to said system and said signal-deriving means and responsive jointly to at least said first portion and said control signal to develop a resultant signal which is representative of at least the brightness of said image and which includes components inversely related to said luminosity effects developed by said undesired components; and means for utilizing said resultant signal and said subcarrier wave signal to reproduce said image, whereby said resultant signal is representative of the brightness of said image with any brightness changes due to said undesired components being effectively eliminated.

11. In a color-television receiver, apparatus for translating a composite signal representative of an image in color and including a first portion representative of the visual brightness of the image and a second portion having a subcarrier wave signal modulated in both amplitude and phase by signals representative of the chromaticity of the image, the second portion having a component representative of the relative luminosity of elemental areas of the image, comprising: a signal-translating system responsive to said composite signal for translating at least said first portion and for translating a modulated signal which is representative of said second portion and which includes undesired components tending to affect the visual brightness of said image; signal-deriving means coupled to said system and including a signal generator arranged for developing a signal synchronized in phase and frequency with said subcarrier wave signal, a phase-delay circuit and a synchronous detector coupled through said phase-delay circuit to said generator for deriving from said translated modulated signal a control signal which is related to said component representative of said relative luminosity and which includes a component representative of the luminosity effects developed by said undesired components, said phase-delay circuit having circuit elements so proportioned as to delay the application of said developed signal to said detector by an amount related to the phase relationship of said relative luminosity component and one of said derived color components representative of said chromaticity; a modulator device coupled to said system and said signal-deriving means and responsive jointly to at least said first portion and said control signal to develop a resultant signal which is representative of at least the brightness of said image and which includes components inversely related to said luminosity effects developed by said undesired components; and means for utilizing said resultant signal and said subcarrier wave signal to reproduce said image, whereby said resultant signal is representative of the brightness of said image with any brightness changes due to said undesired components being effectively eliminated.

12. In a color-television receiver, apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image, comprising: a signal-translating system responsive to said composite signal and including a first signal-translating channel for translating at least said first portion and a second signal-translating channel for translating a modulated signal which is representative of said modulated subcarrier wave signal and which includes undesired components tending to affect the visual brightness of said image; signal-deriving means coupled to said second signal-translating channel for deriving from said translated modulated signal a control signal which is related to said component representative of said relative luminosity and which includes a component representative of the luminosity effects developed by said undesired components; a modulator device coupled to said system and said signal-deriving means and responsive jointly to at least said first portion and said control signal to develop a resultant signal which is representative of at least the brightness of said image and which includes components inversely related to said luminosity effects developed by said undesired components; and means for untilizing said resultant signal and said subcarrier wave signal to reproduce said image, whereby said resultant signal determines the brightness of said image and simultaneously substantially reduces any brightness changes which said second portion tends to produce.

13. In a color-television receiver, apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image, comprising: a signal-translating system responsive to said composite signal and including a first signal-translating channel for translating at least said first portion and a second signal-translating channel having a plurality of filter networks and a modulator for translating a modulated signal of predetermined band width and composition which is representative of said modulated subcarrier wave signal and which includes undesired components tending to affect the visual brightness of said image; signal-deriving means coupled to said second signal-translating channel for deriving from said translated modulated signal a control signal which is related to said component representative of said relative luminosity and which includes a component representative of the luminosity effects developed by said undesired components; a modulator device coupled to said system and said signal-deriving means and responsive jointly to at least said first portion and said control signal to develop a resultant signal which is representative of at least the brightness of said image and which includes components inversely related to said luminosity effects developed by said undesired components; and means for utilizing said resultant signal and said subcarrier wave signal to reproduce said image, whereby said resultant signal determines the brightness of said image and simultaneously substantially reduces any brightness changes which said second portion tends to produce.

14. In a color-television receiver, apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image, comprising: a signal-translating system responsive to said composite signal for translating at least said first portion and for translating a modulated signal which is representative of said modulated subcarrier wave signal and which includes undesired components tending to affect the visual brightness of said image; signal-deriving means coupled to said system for deriving from said translated modulated signal a control signal which is related to said component representative of said relative luminosity and which includes a component representative of the luminosity effects developed by said undesired components; a device for inversely modulating one signal by another coupled to said system and said signal-deriving means and responsive jointly to at least said first portion and said control signal to develop a resultant signal which is representative of at least the brightness of said image and which includes components inversely related to said luminosity effects developed by said undesired components; and means for utilizing said resultant signal and said subcarrier wave signal to reproduce said image, whereby said resultant signal is representative of the brightness of said image with any brightness changes due to said undesired components being effectively eliminated.

15. In a color-television receiver, apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image, comprising: a signal-translating system responsive to said composite signal and including a first signal-translating channel for translating at least said first portion and a second signal-translating channel for translating a modulated signal which is representative of said modulated subcarrier wave signal and which includes undesired components tending to affect the visual brightness of said image; signal-deriving means coupled to said system for deriving from said translated modulated signal a control signal which is related to said component representative of said relative luminosity and which includes a component representative of the luminosity effects developed by said undesired components; a device for inversely modulating one signal by another coupled to said signal-translating channel and said signal-deriving means and responsive jointly to at least said first portion and said control signal to develop a resultant signal which is representative of at least the brightness of said image and which includes components inversely related to said luminosity effects developed by said undesired components; and means for utilizing said resultant signal and said subcarrier wave signal to reproduce said image, whereby said resultant signal is representative of the brightness of said image with any brightness changes due to said undesired components being effectively eliminated.

16. In a color-television receiver, apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image, comprising: a signal-translating system responsive to said composite signal including a filter network having a substantially uniform frequency-response characteristic for translating at least said first portion and another filter network having a substantially nonuniform frequency-response characteristic for translating at least a modulated signal which is representative of said modulated subcarrier wave signal and which includes undesired components tending to affect the visual brightness of said image; signal-deriving means coupled to said system for deriving from said translated modulated signal a control signal which is related to said component representative of said relative luminosity and which includes a component representative of the luminosity effects developed by said undesired components; a modulator device coupled to said system and said signal-deriving means and responsive jointly to at least said first portion and said control signal to develop a resultant signal which is representative of at least the brightness of said image and which includes components inversely related to said luminosity effects developed by said undesired components; and means for utilizing said resultant signal and said subcarrier wave signal to reproduce said image, whereby said resultant signal is representative of the brightness of said image with any brightness changes due to said undesired components being effectively eliminated.

17. In a color-television receiver, apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image, comprising: a signal-translating system responsive to said composite signal for translating at least said first portion and for translating a modulated signal which is representative of said modulated subcarrier wave signal and which includes undesired components tending to affect the visual brightness of said image; signal-deriving means coupled to said system for deriving from said translated modulated signal a control signal which is related to said component representative of said relative luminosity and which includes a component representative of the luminosity effects developed by said undesired components; a modulator device including a pair of amplifiers and a filter network coupled to said system and said signal-deriving means and responsive jointly to at least said first portion and a predetermined frequency portion of said control signal to control the gain of said amplifiers to develop a resultant signal which is representative of at least the brightness of said image and which includes components inversely related to said luminosity effects of said undesired components; and means for utilizing said resultant signal and said subcarrier wave signal to reproduce said image, whereby said resultant signal is representative of the brightness of said image with any brightness changes due to said undesired components being effectively eliminated.

18. In a color-television receiver including a color image-reproducing device having a plurality of control characteristics at least one of which affects the visual brightness of a reproduced image and at least another of which affects the chromaticity and the visual brightness of the reproduced image, an apparatus for translating a composite signal representative of an image in color and including a first portion representative of the visual brightness of the image and a second portion having a subcarrier wave signal modulated by at least a signal representative of the chromaticity of the image, the modulated subcarrier wave signal having a component representative of the relative luminosity of elemental areas of the image comprising: a signal-translating system responsive to said composite signal for translating at least said first portion and for translating a modulated signal which is representative of said modulated subcarrier wave signal and which includes undesired components tending to affect the visual brightness of said image; signal-deriving means coupled to said system for deriving from said translated modulated signal a control signal which is related to said component representative of said relative luminosity and which includes a component representative of the luminance effects developed by said undesired components; a signal-combining device coupled to said system and said signal-deriving means and responsive jointly to at least said first portion and said control signal to develop a resultant signal which is representative of at least the brightness of said image and which includes components inversely related to said luminance effects of said undesired components for application to said control characteristics; and means for applying said resultant signal and said subcarrier wave signal to said image-reproducing device to reproduce said image, whereby said one control characteristic controls the brightness of said image and simultaneously substantially reduces any brightness changes which said second control characteristic tends to produce.

19. In a color-television receiver, apparatus for translating a composite signal representative of an image in color and including a first portion representative of the brightness of the image and a second portion having a subcarrier wave signal modulated by at least a signal representative of the chromaticity of the image, the modulated subcarrier wave signal having a component representative of the relative luminosity of elemental areas of the image, comprising: a first signal-translating channel responsive to said composite signal for translating at least a first signal representative of said first portion; a second signal-translating channel including a filter network having a nonuniform frequency-response characteristic responsive to said composite signal for translating at least a second signal representative of said modulated subcarrier wave signal and which includes undesired color components tending to affect the brightness of said image; a low-pass filter network responsive to said composite signal for translating a component signal which is primarily representative of the low-frequency components of said first portion and having an output circuit; signal-deriving means including a signal generator for developing a signal, a phase-delay circuit for delaying said signal developed in said generator, a detector coupled to said nonuniform filter network and said phase-delay circuit for utilizing said delayed signal to effect the derivation from said second signal of a signal representative of said relative luminosity component and which includes a component representative of the luminance effects developed by said undesired components; a first amplifier circuit coupled to said detector and to said output circuit of said low-pass filter network for translating and for combining said derived signal and said component signal to develop a control signal; and a second amplifier having an input circuit coupled to said first channel and said output circuit of said low-pass filter network responsive jointly to said first signal and said control signal to develop a resultant signal which is representative of at least the brightness of said image and which includes components inversely related to said luminance effects of said undesired components, whereby said resultant signal is representative of the brightness of said image with any brightness changes due to said undesired components being effectively eliminated.

20. In a color-television receiver, apparatus for translating a composite signal representative of an image in color and including a first portion representative of the brightness of the image and a second portion having a subcarrier wave signal modulated by at least a signal representative of the chromaticity of the image, the modulated subcarrier wave signal having a component representative of the relative luminosity of elemental areas of the image, comprising: a first signal-translating channel responsive to said composite signal for translating at least a first signal representative of said first portion; a second signal-translating channel including a 0–4 megacycle filter network having a nonuniform frequency-response characteristic responsive to said composite signal for translating at least a second signal representative of said modulated subcarrier wave signal and which includes undesired color components tending to affect the brightness of said image; a 0–2 megacycle filter network responsive to said composite signal for translating a component signal which is primarily representative of the low-frequency components of said first portion and having an output circuit; signal-deriving means including a signal generator for developing a signal, a phase-delay circuit for delaying said signal developed in said generator, a detector coupled to said nonuniform filter network and said phase-delay circuit for utilizing said delayed signal to effect the derivation from said second signal of a signal representative of said relative luminosity component; a first amplifier circuit coupled to said detector and to said output circuit of said 0–2 megacycle filter network for translating and for combining said derived signal and said component signal to develop a control signal; and a second amplifier having an input circuit coupled to said first channel and said output circuit of said 0–2 megacycle filter network responsive jointly to said first signal and said control signal to develop a resultant signal which is representative of at least the brightness of said image and which includes components inversely related to said undesired components, whereby said resultant signal is representative of the brightness of said image with any brightness changes due to said undesired components being effectively eliminated.

21. In a color-television receiver, apparatus for translating a composite signal representative of an image in color and including a first portion representative of the brightness of the image and a second portion having a subcarrier wave signal modulated by at least a signal representative of the chromaticity of the image, the modulated subcarrier wave signal having a component cumulatively representative of the relative luminosity attributable to the incremental color and the white of elemental areas of the image, comprising: a first signal-translating channel responsive to said composite signal for translating at least a first signal representative of said first portion; a second signal-translating channel including a first band-pass filter network responsive to said composite signal for translating a predetermined band width thereof, a device for inversely modulating one signal by another for deriving from said last-mentioned translated signal a second signal representative of said modulated subcarrier wave signal and which includes undesired color components tending to affect the brightness of said image and including a second band-pass filter network for translating a predetermined band width of said second signal; a low-pass filter network responsive to said composite signal for translating a component signal which is primarily representative of the low-frequency components of said first portion and having an output circuit coupled to said device for inversely modulating; said last-mentioned device being arranged to combine the signal translated through said first band-pass filter network and said component signal to develop said second signal; signal-deriving means including a signal generator for developing a signal, a phase-delay circuit for delaying said signal developed in said generator, a detector coupled to said second band-pass filter network and said phase-delay circuit for utilizing said delayed signal to effect the derivation from said second signal of a color luminance signal representative of that portion of said luminosity component attributable to said incremental color and which includes a component representative of the brightness effects developed by said undesired color components, said means including a source of a signal representative of the relative luminosity for white and means for combining said signal representative of the relative luminosity for white and said color luminance signal to develop a control signal; and another device for inversely modulating one signal by another coupled to said combining means and said first signal-translating channel and responsive jointly to at least said first signal and said control signal to develop a resultant signal which is representative of at least the brightness of said image and which includes components inversely related to said undesired components, whereby said resultant signal is representative of the brightness of said image with any brightness changes due to said undesired components being effectively eliminated.

22. In a color-television receiver, apparatus for translating a composite signal representative of an image in color and including a first portion representative of the brightness of the image and a second portion having a subcarrier wave signal modulated by at least a signal representative of the chromaticity of the image, the modulated subcarrier wave signal having a component cumulatively representative of the relative luminosity attributable to the incremental color and the white of elemental areas of the image, comprising: a first signal-translating channel including a 0–4 megacycle filter network responsive to said composite signal for translating at least a first signal representative of said first portion; a second signal-translating channel including a first 2–4 megacycle filter network responsive to said composite signal for translating a 2–4 megacycle portion thereof, a device for inversely modulating one signal by another for deriving from said 2–4 megacycle portion a second signal representative of said modulated subcarrier wave signal and which includes undesired color components tending to affect the brightness of said image and including a second 2–4 megacycle filter network for translating the 2–4 megacycle portion of said second signal; a low-pass filter network responsive to said composite signal for translating a component signal which is primarily representative of the 0–2 megacycle components of said first portion and having an output circuit coupled to said device for inversely modulating; said last-mentioned device being arranged to divide the signal translated through said first filter network by said component signal to develop said second signal; signal-deriving means including a signal generator for developing a signal, a phase-delay circuit for delaying said signal developed in said generator, a detector coupled to said second filter network and said phase-delay circuit for utilizing said delayed signal to effect the derivation from said second signal of a color luminance signal representative of that portion of said luminosity component attributable to said incremental color and which includes a component representative of the brightness effects developed by said undesired color components, said means including a source of a signal representative of the relative luminosity for white and means for combining said signal representative of the luminosity for white and said color luminance signal to develop a control signal; and another device for inversely modulating one signal by another coupled to said combining means and said first signal-translating channel and responsive jointly to at least said first signal and said control signal to develop a resultant signal which is representative of at least the brightness of said image and which includes components inversely related to said undesired components, whereby said resultant signal is representative of the brightness of said image with any brightness changes due to said undesired components being effectively eliminated.

23. In a color-television superheterodyne receiver, apparatus for translating a composite signal representative of an image in color and including a first portion representative of the brightness of the image and a second portion representative of the chromaticity of the image, the second portion having a component representative of the relative luminosity of elemental areas of the image, comprising: an intermediate-frequency amplifier circuit responsive to said composite signal for translating at least said first portion and for translating a signal which is representative of said second portion and which includes undesired components tending to affect the brightness of said image; a low-pass filter network responsive to a low-frequency portion of said composite signal for translating a component signal which is primarily representative of the low-frequency components of said first portion and having an output circuit; signal-deriving means including a signal generator for developing a signal, a phase-delay circuit for delaying said signal developed in said generator, a detector coupled to said amplifier circuit and said phase-delay circuit for utilizing said delayed signal to effect the derivation from said second signal of a signal representative of said relative luminosity component; and a second amplifier circuit coupled to said intermediate-frequency amplifier circuit, to said detector and to said output circuit of said low-pass filter network for translating said first and second portions and said derived signals and responsive jointly to said translated derived signals and said component signal to develop a control signal for controlling the gain of said amplifier, said first and second portions being translated with said control signal to develop a resultant signal which is representative of at least the brightness of said image and which includes components inversely related to said undesired components, whereby said resultant signal is representative of the brightness of said image with any brightness changes due to said undesired components being effectively eliminated.

24. In a color-television superheterodyne receiver, apparatus for translating a composite signal representative of an image in color and including a first portion representative of the brightness of the image and a second portion representative of the chromaticity of the image, the second portion having a component representative of the relative luminosity of elemental areas of the image, comprising: an intermediate-frequency amplifier circuit responsive to said composite signal for translating at least said first portion and for translating a signal which is representative of said second portion and which includes undesired components tending to affect the brightness of said image; a low-pass filter network responsive to a 0–2 megacycle portion of said composite signal for translating a component signal which is primarily representative of the low-frequency components of said first portion and having an output circuit; signal-deriving means including a signal generator for developing a signal, a phase-delay circuit for delaying said signal developed in said generator, a detector coupled to said amplifier circuit and said phase-delay circuit for utilizing said delayed signal to effect the derivation from said second signal of a signal representative of said relative luminosity component; and another amplifier circuit coupled to said intermediate-frequency amplifier circuit, to said detector and to said output circuit of said low-pass filter network for translating said first and second portions and said derived signals and responsive jointly to said translated derived signals and said component signal to develop a control signal for controlling the gain of said amplifier, said first and second portions being effectively divided by said control signal to develop a resultant signal which is representative of at least the brightness of said image and which includes components inversely related to said undesired components, whereby said resultant signal is representative of the brightness of said image with any brightness changes due to said undesired components being effectively eliminated.

25. A color-television transmitter comprising: means for developing a plurality of color signals collectively representative of the brightness and chromaticity of an image; a first signal-translating channel coupled to said developing means and including a plurality of amplifiers having separate input circuits and effectively combined output circuits for developing a first signal primarily representative of the visual brightness of an image and substantially independent of its chromaticity; a second signal-translating channel coupled to said developing means and including a modulator arrangement for developing a subcarrier wave signal and for modulating said subcarrier wave signal with said color signals to develop a second signal primarily representative of the chromaticity of said image and which includes a component representative of the relative luminosity of elemental areas of said image; a third signal-translating channel coupled to said developing means and including a signal-combining circuit for combining said color signals to develop a third signal representative of the brightness of said image; a modulator circuit for combining at least portions of said first, second, and third signals to develop a fourth signal representative of said chromaticity of said image modulated by a signal representative of the relative luminosity of elemental areas of said image; and means for combining at least two of said first, second, third, and fourth signals to form a composite signal for transmission.

26. A color-television transmitter comprising: means for developing a plurality of color signals collectively representative of the brightness and chromaticity of an image; a first signal-translating channel coupled to said developing means and including a plurality of amplifier circuits each having the gain thereof related to the luminosity of an individual one of said color signals for developing a first signal primarily representative of the visual brightness of an image and substantially independent of its chromaticity; a second signal-translating channel coupled to said developing means and including a modulator arrangement for developing a subcarrier wave signal and for modulating said subcarrier wave signal with said color signals to develop a second signal primarily representative of the chromaticity of said image and which includes a component representative of the relative luminosity of elemental areas of said image; a third signal-translating channel coupled to said developing means and including a signal-combining circuit for combining said color signals to develop a third signal representative of the brightness of said image; a modulator circuit for combining at least portions of said first, second, and third signals to develop a fourth signal representative of said chromaticity of said image modulated by a signal representative of the relative luminosity of elemental areas of said image; and means for combining at least two of said first, second, third, and fourth signals to form a composite signal for transmission.

27. A color-television transmitter comprising: means for developing a plurality of color signals collectively representative of the brightness and chromaticity of an image; a first signal-translating channel coupled to said developing means and including a plurality of amplifiers having separate input circuits and effectively combined output circuits for developing a first signal primarily representative of the visual brightness of an image and substantially independent of its chromaticity; a second signal-translating channel coupled to said developing means and including a modulator arrangement for developing a subcarrier wave signal and for modulating said subcarrier wave signal with said color signals to develop a second signal primarily representative of the chromaticity of said image and which includes a component representative of the relative luminosity of elemental areas of said image; a third signal-translating channel coupled to said developing means and including a signal-combining circuit for combining said color signals to develop a third signal representative of the brightness of said image; a modulator circuit including a device for inversely modulating one signal by another for combining at least portions of said second and third signals and including a modulator responsive jointly to said first and said first-mentioned combined signal to develop a fourth signal representative of said chromaticity of said image effectively modulated by a signal representative of the relative luminosity of elemental areas of said image; and means for combining at least two of said first, second, third, and fourth signals to form a composite signal for transmission.

No references cited.